US006298081B1

(12) United States Patent
Almgren et al.

(10) Patent No.: US 6,298,081 B1
(45) Date of Patent: Oct. 2, 2001

(54) CHANNEL HOPPING IN A RADIO COMMUNICATIONS SYSTEM

(75) Inventors: Knut Magnus Almgren, Sollentuna; Yngve Bengt Persson, Djursholm; Håkan Gunnar Olofsson, Stockholm, all of (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 08/866,143

(22) Filed: May 30, 1997

Related U.S. Application Data

(63) Continuation-in-part of application No. 08/765,945, filed on Jan. 13, 1997, now Pat. No. 5,937,002.

(30) Foreign Application Priority Data

May 31, 1996 (SE) .................................................. 9602152

(51) Int. Cl.[7] .................................................. H04B 15/00
(52) U.S. Cl. .................................................. 375/132
(58) Field of Search ........................... 375/202; 455/450, 455/451, 452; 575/132, 133, 138

(56) References Cited

U.S. PATENT DOCUMENTS

| 4,716,573 | 12/1987 | Bergstrom et al. . |
| 4,780,885 | * 10/1988 | Paul et al. ............................... 455/62 |
| 4,998,290 | 3/1991 | Olenick et al. . |

FOREIGN PATENT DOCUMENTS

| 44 03 483 | 2/1994 | (DE) . |
| WO91/13502 | 2/1991 | (WO) . |
| WO93/17507 | 2/1993 | (WO) . |
| 9402492 | 1/1996 | (WO) . |
| WO 96/02979 | * 2/1996 | (WO) .................................. 375/202 |
| WO96/02979 | 7/1997 | (WO) . |

* cited by examiner

Primary Examiner—Chi Pham
Assistant Examiner—Kevin M Burd
(74) Attorney, Agent, or Firm—Burns, Doane, Swecker & Mathis, L.L.P.

(57) ABSTRACT

The invention relates to a method and apparatus for channel hopping between mobile stations (MS1–MS3) and a base station (BS1) in a radio communications system. A channel allocation means (211) within the base station (BS1) generates channel hopping sequences that are transmitted via a control channel (SACCH) to hopping sequence lists (204–206) in the mobile stations (MS1–MS3). The hopping sequences are also transmitted to corresponding hopping sequence lists (201–203) in the base station (BS1). A channel hopping sequence is divided into a number of sequence intervals ($T_i$) corresponding to the time between two adjacent channel hops within a channel hopping sequence. In the channel allocation means (211) the attenuation ($\delta$) of the connections (F1–F3) and the interference (I(channel,t)) of the channels are continuously being observed within each sequence interval ($T_i$). The channel allocation means (211) generates channel hopping sequences according to the principle that a connection that has poor connection quality will be allocated a channel hopping sequence with channels of high channel quality and connections with successively better connection quality are allocated channel hopping sequence having successively poorer channels.

34 Claims, 10 Drawing Sheets

CHANNEL HOPPING IN A RADIO COMMUNICATIONS SYSTEM

CROSS-REFERENCE TO RELATED APPLICATION

This application is a continuation-in-part to copending, commonly assigned U.S. nonprovisional application Ser. No. 08/765,945, filed Jan. 13, 1997, now patented as U.S. Pat. No. 5,937,002.

FIELD OF THE INVENTION

The present invention relates to the field of radio communications, and then particularly to a method of channel hopping between different channels in a radio communications system. The invention also relates to apparatus in a radio communications system for implementing the method. The proposed method can be applied with frequency-divided and time-divided systems, such as FDMA and TDMA systems, and also in CDMA systems.

BACKGROUND ART

The term channel hopping is used in this document as a collective term for making hops between different information transmission channels, such as hops solely between frequencies, hops solely between time slots and hops between both frequencies and time slots in a radio communications system, for instance.

As is well known to the person skilled in this art, frequency hopping may be applied in a radio communications system to improve the performance of the radio system or as a security measure against unauthorised listening to radio communications. Frequency hopping is carried out in a predetermined order in such systems, without taking the prevailing quality of the connection into account. Frequency hopping in radio communications systems is thus not adaptive.

There can be established between a transmitter and a receiver of a radio communications system a radio connection over which radio communication can take place. The connection is two-directional, i.e. includes a downlink which forms the connection in a direction away from a base station of the system to a mobile station, and an uplink which forms the connection in the opposite direction, i.e. from the mobile station to the base station. Transmission and reception of radio traffic on different connections is effected on channels that can be defined by a given frequency in an FDMA system (Frequency Division Multiple Access), or by a combination of a given frequency and a given time slot in a system that utilizes TDMA (Time Division Multiple Access). A channel may be defined by a code in a CDMA system (Code Division Multiple Access). Seen generally, the channels that are available in a radio communications system may be disturbed significantly by other radio traffic, including radio signals on the same channels as those used for other connections, wherewith each channel in the system has a certain interference level. Thus if each connection were to use solely one channel, the connections would obtain different interference levels. The interference experienced by some connections may be so heavy as to deny an acceptable call quality. The differences in call quality of the connections can be evened-out, by jumping between different channels, wherein the connections use channels of mutually different interference levels. This spreads the use of the channels between the various connections and, with the aid of interleaving and error correction coding, more connections can obtain an acceptable call quality when the system is observed in its entirety.

Each connection may be allocated a plurality of channels, wherein the system controls the connections during ongoing communication, such as to cause the channels to hop between the channels in accordance with a given hopping rule.

This rule may, for instance, be a predetermined pseudo-random series, in which case the connections would appear to hop randomly between all available channels; cf. in this regard European Patent Application EP 93905701-4. However, this type of channel hopping may result in an unnecessarily high interference level, since the channels are not always allocated to the connections in an optimal manner when a pseudorandom series is used.

Another type of channel hopping is cyclic channel hopping. In cyclic channel hopping, a connection hops between a number of channels in accordance with a cyclically repeated channel hopping sequence.

It is well known that channel hopping can be applied in a GSM system. The GSM system is a TDMA system, meaning that each frequency is divided into a plurality of time slots that form a TDMA frame. In the GSM system a TDMA frame is comprised of eight time slots. When establishing a connection between base station and mobile station in a GSM system, the connection is allocated one of these time slots in each TDMA frame. Channel hopping is then effected, by hopping the connection between channels that have the same time slot, wherein in practice the connection hops solely between different frequencies. According to the GSM specification, a particular frequency may occur only once in a channel hopping sequence, and the frequencies in a channel hopping sequence will always occur in a rising order. On the other hand, the duration of the channel hopping sequences may vary between different base stations.

A radio communications system will normally include a plurality of channels that can be used for establishing connections between a given base station and mobile stations. It is then important that the same channel is not used simultaneously for two or more connections between the base station and mobile, stations. If two base station transmitters transmit to their respective receivers different signals simultaneously on the same channel, it is very likely that at least one receiver will be disturbed by interference deriving from the transmission to the other receiver. When this cannot occur, i.e. when only one of the base station connections can be transmitted on a channel at each point in time, it is said that the base station has orthogonality.

When a connection in a radio communications system is excessively poor, so that acceptable speech quality cannot be achieved, it may be due to an excessively low ratio between signal strength and interference. By signal strength is meant the strength of the received desired signal. By interference is meant the sum of the signal strength of all received undesirable signals on the channel used. These undesired signals arrive primarily from other connections that use the same channel in nearby cells in the radio communications system. The received undesirable signals may also arrive from those connections within the own cell that use an adjacent frequency or time slot.

The strength of the desired received signal will depend on transmitter power and on the extent to which the desired signal is attenuated in its path from the transmitter to the receiver. Attenuation is determined, among other things, by distance, direction and topology between transmitter and receiver. Other terms used in parallel with attenuation are path gain and path loss, as the skilled person is well aware.

Channel hopping in a radio communications system is described in the International Patent Application WO 96/02979. Channel hopping is effected between a plurality of channels that are each allocated a respective connection. A signal attenuation parameter, e.g. path gain, is measured in respect of the connections, which are thereafter ordered with respect to the signal attenuation parameter. The described method includes measuring a mean value of a channel quality parameter, such as interference, on individual channels. The channels are thereafter ordered with respect to the measured channel quality parameter. Only those channels that will provide the best channel quality are used for establishing the connections.

When allocating channel hopping sequences to connections, attention is paid to the connection quality of respective connections and to the channel quality of the channels in respective channel hopping sequences. A low quality connection is allocated a channel hopping sequence in which the channels used have a high quality, and a high quality connection is allocated a channel hopping sequence in which the channels used have a low (poorer) channel quality. This division of channel hopping sequences to connections ensures that orthogonality is achieved in each base station. A channel hopping sequence may include a different number of channels in different base stations. The number of channels used in a channel hopping sequence is fixed within a base station.

Swedish Patent Application SE 94022492-4 describes a method and apparatus for channel hopping in a radio communications system. A mean interference value in respect of the channels in the radio communications system is determined, or measured, for each connection. The values obtained are stored in an interference list for each of the connections involved. The values in the interference lists are then weighted and the resultant weighted lists analysed. There is then generated for each connection a hop sequence list on the basis of the analysis of the weighted lists. A channel that has a high weight value for a given connection will often occur more frequently in a corresponding hop sequence list than a channel that has a low weight value.

The aforedescribed methods provide a mean interference value. However, the interference may vary with time and consequently the channel interference may differ at different time intervals within a channel hopping sequence. It would therefore be desirable to obtain the values of the interference within those different time intervals in a channel hopping sequence in which a channel may be used.

The American patent U.S. Pat. No. 4,998,290 describes a radio communications system that utilizes frequency hopping. The system includes a central control station that allocates frequencies for communication with a plurality of participating local radio stations. The control station establishes an interference matrix that reflects the capacity requirement of the different radio stations and interference on all connections.

One drawback with this method is that it is necessary to install a central control station in the system, wherewith the system becomes more complex.

German Patent Application DE 4403483A describes a method of reorganizing frequency jump groups for an FDM/TDM radio transmission. A plurality of pre-defined frequency hop tables are stored in a base station controller, ESC. One table (TAB) is used at a time. If any connection that utilizes one of the frequency hop sequences in the table is of poor quality, the table (TAB) used on that occasion is replaced with a new table (TAB1). The switch from a current table to a new table is effected stepwise. In one exemplifying embodiment, the frequency hop sequences are changed for two time slots at a time. The switch, or change, only takes place when no information is transmitted on these time slots.

One drawback with this method is that the frequency hop tables are pre-defined. When the interference situation is not observed continuously, the best channels with regard to interference cannot be utilized in an optimal fashion. Another drawback is that attenuation of the connections is not taken into account when allocating hop sequences thereto.

The International Patent Application WO 91/13502 describes a method for carrier-divided frequency hopping. All available frequencies in the radio communications system that can be used for frequency hopping are found in a frequency pool from which channel hopping sequences are determined. Each base station is allowed to choose frequencies from the frequency pool when frequency hopping. The distance of the mobile station from the base station is taken into account when allocating a time slot to a mobile station that wishes to setup a connection. Nearby mobile stations are given the centermost time slots of a TDMA frame, whereas remote mobile stations are given time slots that lie respectively at the beginning and at the end of a TDMA frame. This is done in order to avoid overlapping of time slots (Time alignment).

The International Patent Specification WO 93/17507 describes a method of communication in a TDMA cellular mobile radio communications system that uses frequency hopping. A mobile station in one cell selects radio channels and time slots independently of a mobile station in a neighbouring cell. The hop sequences within a cell are selected so that no co-channel interference will occur. Although co-channel interference may occur between cells, it is considered that such an occurrence is only on a small scale. The power output of the mobile stations is controlled such that mobile stations that are located close to the base station will transmit on a lower power than mobile stations that are located far away from the base station.

One drawback with the methods proposed in these two latter patent specifications is that the interference situation is not taken into account when generating hop sequences. Another drawback is that attenuation of the connections is not taken when allocating hop sequences to connections.

SUMMARY OF THE INVENTION

The invention deals with a problem of how channels shall be allocated to different connections between a base station and mobile stations that are located within the area covered by the base station. The base station forms part of a radio communications system that utilizes channel hopping, wherein one problem resides in allocating channels to connections in a manner which will ensure that the connections do not disturb one another to an unnecessary extent, preferably to the least possible extent, and so as to obtain good connection quality. The problem also includes the manner in which orthogonality within the base station can be ensured.

Another problem resides in how the radio communications system shall be observed in different time intervals within a channel hopping sequence with respect to the quality of the channels used for channel hopping, so as to continuously obtain reliable quality values.

Accordingly, one object of the present invention is to optimise the use of available base station channels with respect to the quality of connections between the base station and those mobile stations that are located in the area covered by the base station, with the aid of a channel hopping method.

Another object is to observe the radio communications system with respect to channel quality in different time intervals within a channel hopping sequence.

Yet another object is to ensure orthogonality in the base station, or base station orthogonality, in conjunction with the aforesaid optimisation of channel use, i.e. to ensure that only one base station connection at a time will utilize a channel that is available in said base station.

The aforesaid problems are solved by means of an inventive method and an inventive radio communications system. The method may include observing the system with respect to connection quality and channel quality, wherein signal attenuation parameters and channel quality parameters are generated.

The signal attenuation parameter indicates the extent to which the connection is influenced by attenuation. A low value with respect to the signal attenuation parameter indicates that the connection has low attenuation, whereas a high value of the signal attenuation parameter will indicate that the connection has high attenuation.

The channel quality parameter indicates the extent to which a channel or frequency is disturbed by interference. A low value with respect to the channel quality parameter will indicate that the channel or the frequency has low interference, and, conversely, a high value indicates that the channel or frequency has high interference.

The method assumes that the number of channels in a channel hopping sequence is constant in the radio communications system, which can be expressed as saying that all connections in the system use the same hopping sequence duration.

The hopping sequence duration, and therewith the channel hopping sequences, is divided into a number of sequence intervals when generating the channel quality parameters. The sequence interval may, in turn, be divided into one or more generating intervals within which the channel quality parameter is generated.

According to the method, one channel quality parameter is generated for each frequency and for each generation interval.

Channel hopping sequences may be generated in accordance with the determined channel quality parameters. The channel hopping sequences can then be allocated to different connections in accordance with the connection quality parameters and channel quality parameters.

More specifically, an inventive method may include observing the connections in said system with respect to connection quality. Connection quality may relate to the extent to which attenuation affects the connection. A signal attenuation parameter, such as path gain for instance, is determined for the connections. The connections are then ordered in accordance with the determined signal attenuation parameter.

The inventive method also includes observing the quality of the channels or of the frequencies (when applicable) in the system. Channel quality is able to indicate the extent to which a channel or frequency is disturbed by interference. A channel quality parameter, such as interference for instance, is determined for each frequency and for each generation interval. A channel quality parameter is obtained for each frequency or for each channel depending on the duration of the generation interval and on the type of radio communications system concerned. When the generation interval is a time slot in a TDMA system, a channel quality parameter will be determined for each channel. The channels, or frequencies, are then ordered in accordance with the determined channel quality parameters. The channels/frequencies are ordered in a channel list for each sequence interval in accordance with the determined channel quality parameter.

The channel quality parameter may also be obtained by measuring, for instance, the C/I value or the bit error rate, BER, and then calculating an interference value with the C/I value or the bit error rate as input data.

Channel hopping sequences are then generated. Each channel hopping sequence utilizes a channel taken from a respective channel list, i.e. for respective sequence intervals. Only the best channels with respect to the channel quality parameter are used.

Hopping sequences are then allocated to the connections according to the principle that a connection that has poor connection quality will be allocated a channel hopping sequence with channels of high channel quality. Connections with successively better connection quality are allocated channel hopping sequence having successively poorer channels. This can be expressed simply by saying that the worse a connection with respect to attenuation, or with respect to some other connection quality measurement, the better the channels with respect to interference, or with respect to some other channel quality measurement, allocated to the connection. The orthogonality in the base station is ensured, by allowing only one given channel to occur once within each sequence interval.

It will be noted that the terms high and low channel quality refer to the quality of those channels that are actually used in the channel hopping sequences. Channels that are not used in a channel hopping sequence will have poorer channel quality than the worst channel used in a channel hopping sequence.

The connections then hop between their allocated channels. One channel in the channel hopping sequence is used in each section interval. When the last channel in a channel hopping sequence has been used, the first channel in the channel hopping sequence is then re-used, and so on.

The inventive method may be repeated continuously or intermittently, wherein channel allocation to old connections can be updated. Because the method is repeated, any newly established connections can be allocated channels between which they may hop. The invention also includes apparatus for carrying out the method.

The advantages afforded by the method include adaptive channel allocation and that the orthogonality in the base station is ensured at the same time.

A further advantage is that the quality of the channels included in a channel hopping sequence is determined at the different time intervals in a channel hopping sequence in which they can be used. This implies improved accuracy in the observation of channel quality. This enables the advantages afforded by channel hopping, i.e. the division of the interference over different connections, combined with the advantages that are afforded by a radio communications system that does not use channel hopping. In such a system, the interference situation can be observed for each channel.

Another advantage is that the method results in improved channel utilisation, by virtue of a connection having high attenuation being allocated channels that have low interference, and by virtue of allocating to a connection that has low attenuation channels that have higher interference, i.e. higher interference in relation to the utilized best channels. The advantages thus afford improved call quality on more connections, improved capacity and a lower total of interference levels in the radio communications system.

The invention will now be described in more detail with reference to exemplifying embodiments thereof and also with reference to the accompanying drawings.

DESCRIPTION OF PREFERRED EMBODIMENTS

Figure 1A:
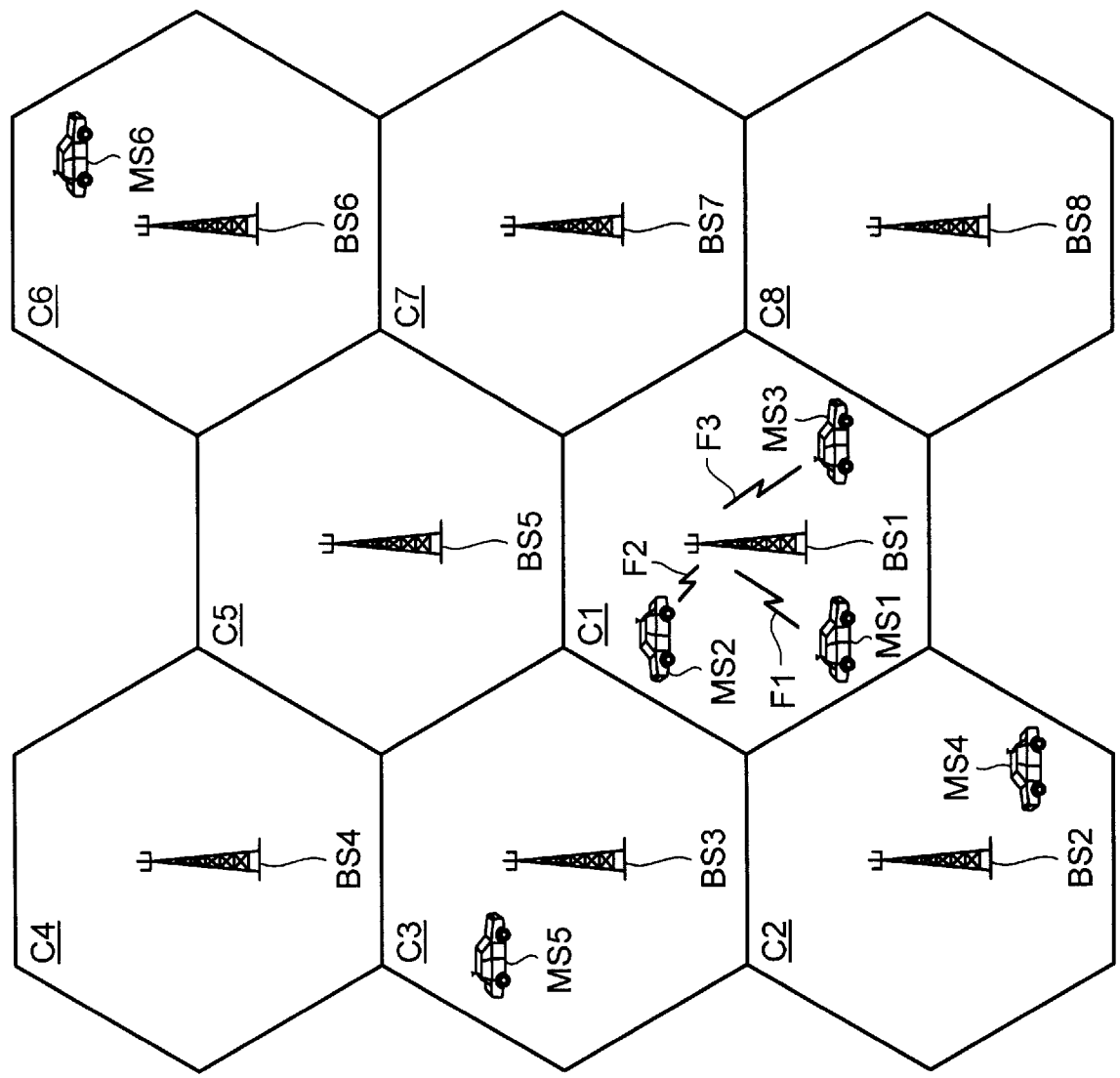
FIG. 1a is a schematic view over a part of a radio communications system.

FIG. 1a illustrates schematically part of a radio communications system. In the illustrated case, the system is a cellular mobile radio network PLMN, that includes base stations BS1–BS8. Each base station has a certain range within which radio communication can be established with mobile radio stations or mobile stations MS1–MS6 located within the coverage area defined by this range. The cells C1–C8 represent the geographical areas covered by the base stations BS1-BS8. The base stations are connected to remaining nodes of the mobile radio network, for instance base station controller centres, BSC, mobile switching centres, $MSC_1$ and gateway mobile switching centres, GMSC, according to known technology. Since these nodes have no particular significance in respect of the present invention, they have not been shown in the Figure nor described in detail in the present context.

Figure 1B:
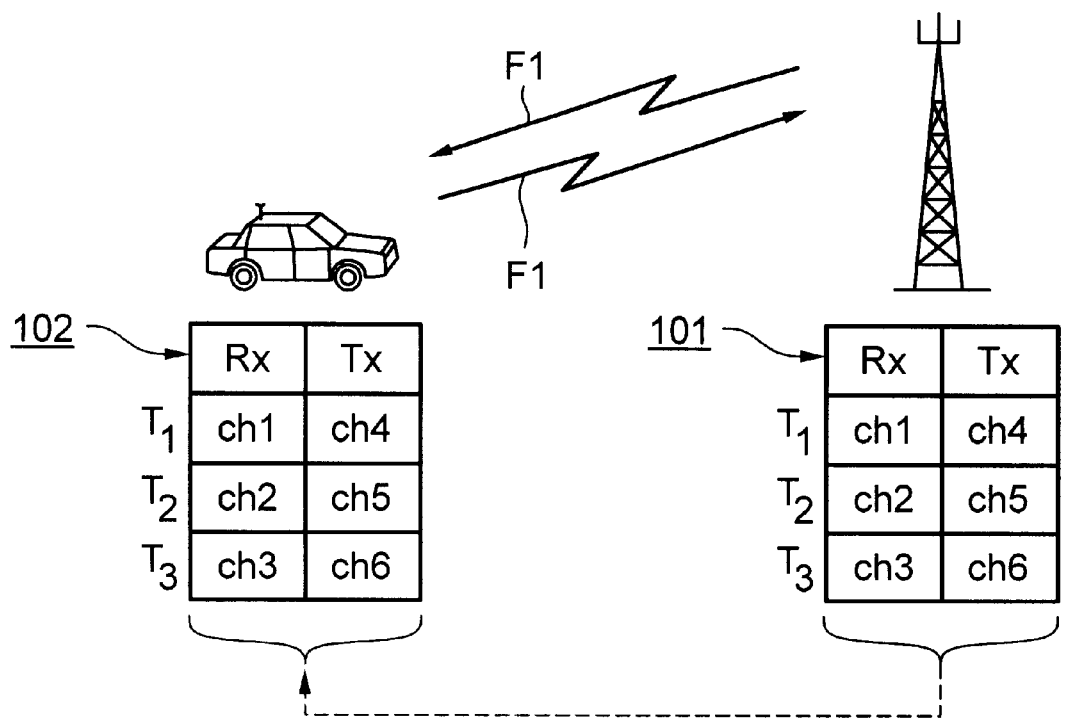
FIG. 1b is a block schematic illustrating three mobile stations and a base station located in a cell in the radio communications system, and illustrates the channel hopping principle of the invention.

FIG. 1b illustrates schematically the principle of channel hopping in accordance with the present invention. The base stations in the radio communications system include hopping sequence lists. These lists contain information relating to those channels that shall be used by the base station for communication with those mobile stations that are located within the area covered by said base station. Thus, when a base station handles a number of connections to different mobile stations, the base station will possess a hopping sequence list for each connection.

Thus, the base station S1 in cell C1 includes a hopping sequence list 101 for connections to the mobile station MS1.

The corresponding hopping sequence lists for connections to the mobile stations MS2 and MS3 are not shown in the Figure. The hopping sequence list 101 in the base station BS1 includes three transmission channels ch1-ch3 designated Tx, and three reception channels ch4-ch6 designated Rx. The time taken to run through a channel hopping sequence is divided into a number of sequence intervals $T_i$. Thus, the base station transmitter transmits on channel ch1 during the whole of a first sequence interval $T_i$ or during parts of said first interval, on channel ch2 during the whole of a second sequence interval $T_2$, or during parts of said second interval, and on channel ch3 during the whole of a third sequence interval $T_3$, or during parts of said third interval. The index i that indicates the number of the sequence interval $T_i$ is its sequence index. These three channels are said to form a channel hopping sequence for transmission from the base station BS1 to the mobile station MS1. Transmission from the base station to a given mobile station, and vice versa, may be offset in time within the sequence interval. When the last channel in a channel hopping sequence has been used, the first channel is used again in the channel hopping sequence, and so on.

The hopping sequence ch1-ch3 is then repeated cyclically during the time in which the radio connection is established with the mobile station MS1, or until a new allocation of channels is made to the hopping sequence list 101 in accordance with the following description. The receiver in the base station BS1 receives on the channel ch4-ch6 in the sequence interval $T_1$–$T_3$, whereafter said channel hopping sequence is repeated in the same way as that described above with reference to the transmitter. Three channels are used in each channel hopping sequence in the illustrated embodiment. The number of channels used in the channel hopping sequences, in other words the sequence duration L, is a system parameter that can be arbitrarily chosen. However, the sequence duration L must be the same in all base stations in the system, for reasons made evident hereinafter.

The mobile station MS1 includes a hopping sequence list 102. The hopping sequences in the hopping sequence list 101 and 102 are identical, although the channel hopping sequence used in the base station for transmission purposes is, of course, used for reception in the mobile station, and the channel hopping sequence used in the base station for reception purposes is used for transmission in the mobile station. Thus, the channels ch1-ch3 form the channel hopping sequence when receiving, and the channels ch4-ch6 form the hopping sequence when transmitting, in respect of the sequence interval $T_1$–$T_3$ in the mobile station MS1.

The channels stored in the hopping sequence lists and used by the base stations and mobile stations are selected in accordance with an inventive method that will be described in more detail hereinafter. However, some main principles may be mentioned already at this stage of the description. A channel hopping sequence is preferably generated in the base station, e.g. the channel hopping sequence for transmission from said base station. Channel hopping sequences for reception in the base station can then be obtained, by using the duplex spacing, which is the frequency spacing between uplink and downlink, as is well known to the person skilled in this field. The resultant hopping sequence list for reception in the base station is then sent from the base station to the mobile station over a control channel and is used by the mobile station as its hopping sequence list, in the manner explained above. This transmission of the base-station hopping sequence list 101 to the hopping sequence list 102 in the mobile station MS1 is symbolised by the broken line in FIG. 1b.

It is also possible to generate a channel hopping sequence in the mobile station and then use the duplex spacing to obtain the other channel hopping sequence, therewith obtaining a hopping sequence list for the base station. This list is then sent to the base station on the control channel, as described above.

An alternative possibility is one of generating the channel hopping sequences for transmission and reception respectively for each connection, either in the base station or in the mobile station, without using the duplex spacing. This alternative possibility can be used in systems that do not utilize duplex spacing. This is described in an exemplifying embodiment, with reference to FIG. 6.

Figure 2:
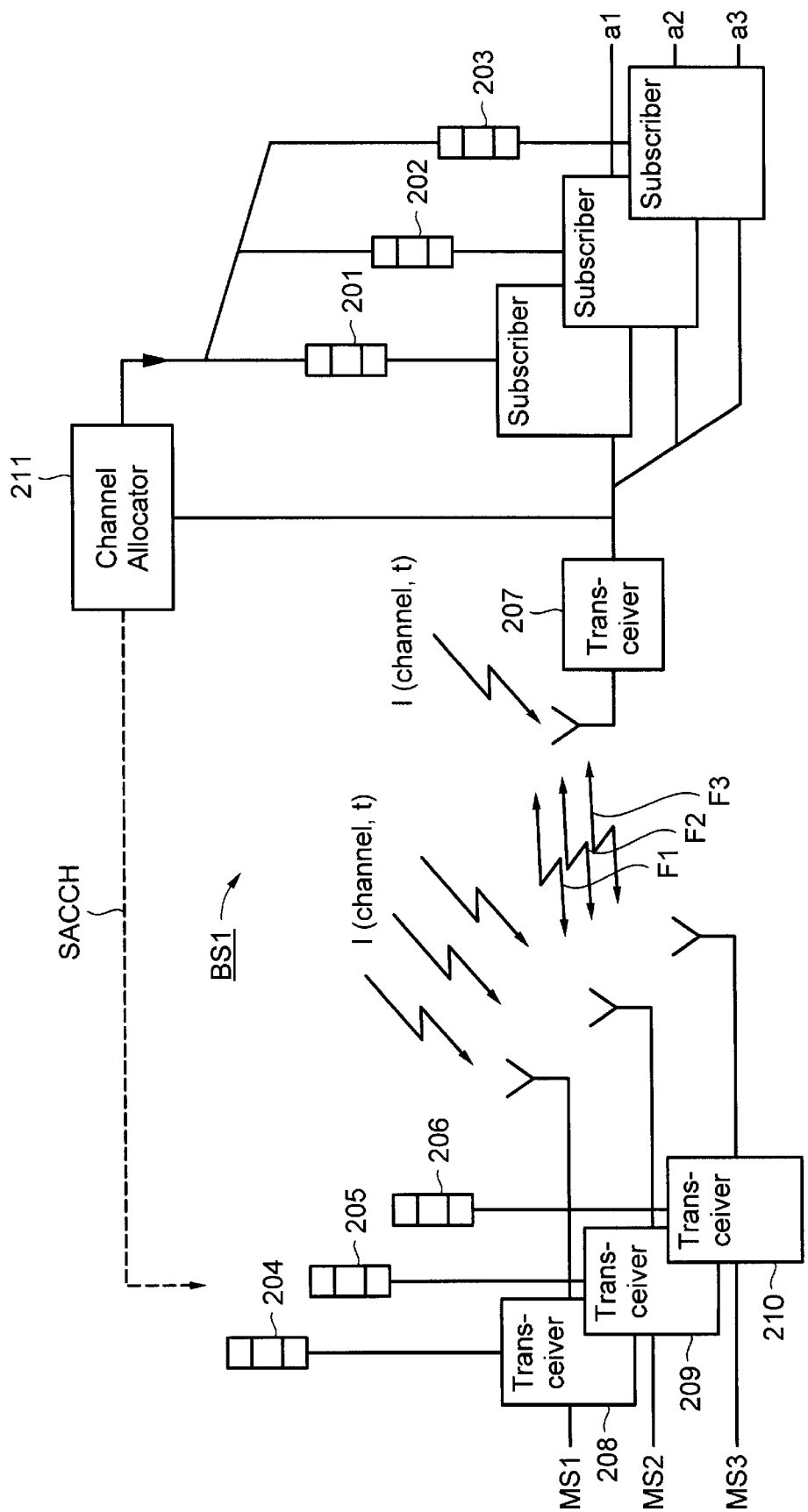
FIG. 2 is a block schematic illustrating three mobile stations and a base station located in a cell in a radiocommunications system, and also shows channel hopping in accordance with the invention.

FIG. 2 is a block schematic that illustrates parts of the three mobile stations MS1-MS3 and the base station BS1 in cell 1 shown in FIG. 1a. The base station includes means, e.g. circuits, for storing hopping sequence lists 201–203 for each of the three connections between the subscribers a1–a3, which may be fixed or mobile subscribers, and the mobile stations MS1–MS3. The mobile stations include circuits for each of their respective hopping sequence lists 204–206, these lists being counterparts of the hopping sequence lists in the base station, as described above. It is assumed in this embodiment that the hopping sequence lists 201–206 include three transmission channels and three reception channels.

The base station includes a transceiver unit 207 which transmits/receives radio signals to/from the mobile stations on the allocated channels. The receiver part of the unit 207 may also be used to measure channel quality, e.g. by measuring the interference on the channels used in the system. Seen generally, this interference is both channel-dependent and time-dependent and can thus be written as I(channel,t). As an alternative to using the receiver part of the unit 207 for measuring channel quality, the base station may be provided with a separately allocated broadband receiver to this end. In the following examples, however, it is assumed that the receiver part of the transceiver unit 207 is used to measure channel quality.

Each of the mobile stations MS1–MS3 includes its own transceiver unit 208–210 for radio signals to/from the base station. An interference I(channel,t) is also received in the receivers of the mobile stations. A channel allocating means 211 in the base station BS1 allocates channels that form the channel hopping sequences in the hopping sequence lists, as will be described in more detail hereinafter. The hopping sequences are then transferred from the channel allocation means 211 to the base station hopping sequence lists 201–203 and to the mobile station hopping sequence lists 204–206, wherein a control channel, such as the control channel SACCH (Slow Associated Control Channel) may be used for the transmission to the mobile stations as mentioned above. The transfer of the channel hopping sequences to the hopping sequence lists 204–206 is shown separately with a broken line in the Figure, for the sake of clarity. However, this transfer is effected in a known manner with the aid of the transceivers 207–210 and under the control of a central processing unit CPU (FIG. 3). The base station and the mobile stations thus know, through the channel hopping sequences, on which channel transmission and reception shall take place within each sequence interval $T_i$.

Figure 3A:
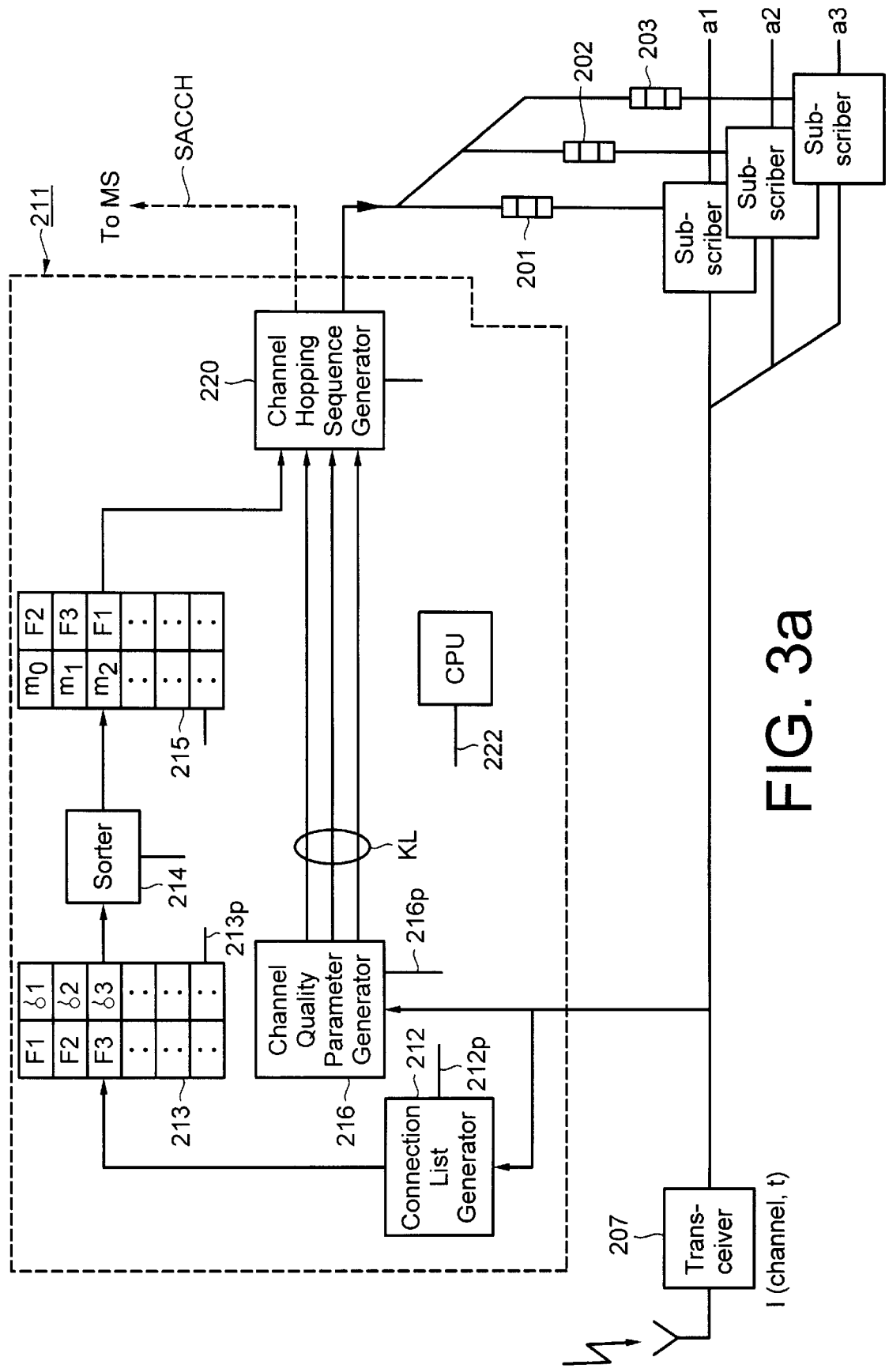
FIG. 3a is a block schematic illustrating a first embodiment of the invention.

FIG. 3a is a block schematic that illustrates the channel allocation means 211 in the base station BS1 in more detail. The channel allocation means 211 includes a means 212 for generating a signal attenuation parameter that indicates the extent to which a radio signal has been attenuated between the transmitter and the receiver in respect of a given connection. In principle, the signal attenuation parameter of a given connection between a base station and a mobile station may be generated by sending from the base station to the mobile station a measuring signal of known signal strength. The mobile station registers the received signal strength and reports the value back to the base station, therewith enabling the signal attenuation parameter to be calculated. It is likely that the received signal strength will contain signal strength contributions from other base stations, in addition to the signal strength contribution from the transmitted measuring signal. It can be assumed, however, that the major part of the received signal strength will derive from the transmitted measuring signal. For instance, in a mobile radio network such signal attenuation measurements are made repeatedly in respect of connections that are about to be established and that have already been established. This is carried out with the aid of control channels in a manner well known to the person skilled in this art, and hence the method of operation of the means 212 will not be described in detail in the present context.

Measuring of the signal attenuation parameter has been described with reference to the downlink, i.e. when the measuring signal is sent from the base station. It will be understood, however, that the measuring signal may be sent from the mobile station equally as well, in which case the signal attenuation parameter is then measured in the uplink. However, signal attenuation of a connection can be assumed to be the same in both the uplink and downlink with good approximation, and thus it is of no significance to the application of the invention if the signal attenuation parameter is measured in the uplink or in the downlink.

The means 212 generates a connection list 213 in which there is stored a signal attenuation parameter $\beta_1, \beta_2, \ldots$ for respective connections F1, F2, . . . , . The signal attenuation parameter stored in the connection list 213 constitutes input data to the algorithm that is used for the allocation of channels to the hopping sequence lists in accordance with the following description. A sorting means 214 compares the signal attenuation parameters with one another and stores the connections in accordance with the parameters in a sorted connection list 215, wherein the connection that has the lowest signal attenuation parameter is stored first in the connection list, i.e. is ranked first in the list. The connection that has the lowest signal attenuation parameter is referenced $m_0$ in the sorted connection list 215, the connection that has the next lowest signal attenuation parameter is referenced $m_1$, and so on, said connections thus being ordered in a sequence according to increasing signal attenuation. Thus, when a connection has a low signal attenuation parameter this indicates that the signal has been attenuated only slightly on the connection and that the connection is of good quality with respect to signal attenuation.

The channel allocation means 211 also includes a means 216 for generating a channel quality parameter for each channel or for each frequency that can be used in a channel hopping process and for each sequence interval $T_i$ in accordance with the description of the following embodiments. The means 216 also generates a sorted channel list KL for each sequence interval $T_i$ in the channel hopping sequence on the basis of the generated values of the channel quality parameter, as described hereinafter with reference to FIGS. 3b and 3c (the units 307a–307c, 407a–407c).

The sorted connection list 215 and the sorted channel lists (307a–307c in FIG. 3b, 407a–407c in FIG. 3c) are delivered to a channel hopping sequence generating means 220. The means 220 generates and allocates channels to the channel hopping sequences, these channels then being transferred to the hopping sequence lists 201–203 in the base station and to the hopping sequence lists 208–210 in the mobile stations MS1–MS3 via the control channel SACCH (FIG. 2).

The channel hopping sequence generating means 220 allocates these sequences to connections in accordance with the principle that a given connection of poor quality shall be allocated a channel hopping sequence that includes good quality channels. Connections with successively better qualities are allocated channel hopping sequences that includes channels of successively poorer quality. Ideally, all connections will have the same C/I value. The allocation of channels to the channel hopping sequences for said connections may be effected by means of an inventive method described in more detail hereinafter.

Put in a somewhat simpler manner, channel hopping sequences are allocated to the connections according to the principle whereby a connection that has a low connection quality, e.g. expressed as high attenuation, is allocated a number of channels of high channel quality, e.g. expressed as low interference, whereas a connection that has a higher connection quality is allocated a number of channels that have a lower channel quality, e.g. expressed as higher interference. Another way of expressing the same thing is to say that the poorer a connection with respect to attenuation, the better channels with respect to interference, or some other channel quality measurement allocated to the connection. Allocation of channels to connections is effected so as to ensure orthogonality, i.e. to ensure that a plurality of connections with the base station do not use the same channels at one and the same time.

In order to illustrate the control of the various means included in the invention in a simple and an easily understood manner, the embodiment shown in FIG. 3a includes a central processing unit, CPU. The central processing unit, CPU, in the channel allocation means 211 can communicate with the aforedescribed means and control the described course of channel allocation. This communication may take place with the aid of control signals transmitted between the central processing unit, CPU, and said means, wherein the control signals are sent on a bus 222 between the central processing unit and ports 212p, 213p, . . . , 220p on said means, as illustrated schematically in FIGS. 3a–3c. Not all ports have been numbered in the Figure, for space reasons.

Naturally, the various devices used in accordance with the invention need not be controlled from a central processing unit, CPU, in the channel allocation means 211. Each means may include its own software for controlling its particular functions, therewith distributing control in the system.

The channel lists (307a–307c in FIG. 3b, 407a–407c in FIG. 3c) include channels or frequencies, depending on the system concerned, that are sorted with respect to the measured channel quality parameter. This is based on defining a channel by a frequency in an FDMA system and by a frequency and a time slot in a TDMA system. In addition, in a TDMA system channel hopping in respect of a connection involves hopping solely between channels in one and the same time slot, which means hopping solely between frequencies. In the case of a TDMA system, hopping may also take place between channels that have mutually different time slots, i.e.. hopping between both frequencies and time slots.

Respective channel lists may include those channels or frequencies, whichever are applicable, that can be used for channel hopping sorted with respect to the measured channel quality parameter. A channel quality parameter is measured, or determined, for each frequency in each generating interval $\Delta T_k$, this generating interval forming the whole of a sequence interval $T_i$ or a part of said interval $T_i$, as described in more detail hereinafter with reference to FIG. 3b. Thus, when the generating interval in a TDMA system is the time of one time slot, a channel quality parameter will be measured for each channel.

An embodiment of the means 216 for generating a channel quality parameter will now be described in more detail with reference to FIG. 3b.

A mean value of the channel quality parameter for each of the frequencies $f_1$-$f_n$ is measured by the receiver part in the transceiver unit 207. x=1,2, . . , n. Seen generally, the channel quality parameter is time-dependent and indicates the quality of a channel with respect to, e.g., channel interference I(t). Index x designates frequency number.

Other parameters may also be measured with respect to the frequency, such as bit error rate or C/I value for instance, and an interference value may be calculated from these values. For instance, in a mobile radio network such measurements of the interference at said frequencies are repeatedly measured in a manner known to the person skilled in this art.

If a separate receiver, for instance a broadband receiver, is used for measuring the mean values of the channel quality parameter, a channel filtering means may be used for filtering the received broadband signal so as to obtain a value for each frequency. The filters separate the received broadband signal to all of the frequencies $f_1$-$f_n$ that can be used in the system.

The signal values obtained when measuring the channel quality parameter can be squared, wherein the result obtained reflects the strength of incoming signals for each frequency f1–fn.

The means 216 for generating a channel quality parameter also includes a sequence counter 303. The sequence counter 303 indicates the sequence interval $T_i$ in which the channel hopping sequence is located, where the index i designates the sequence index.

Each time interval within which the connection transmits on a channel occurs during a sequence interval $T_i$. Thus, the first channel in a channel hopping sequence is used during the whole of a first sequence interval T, or during parts of said interval $T_i$, as indicated with a first sequence index I1. The second channel in the channel hopping sequence is used during the whole of the second time interval $T_2$ or during parts of this second interval, as indicated by a second sequence index I2, and so on. It is assumed in the present embodiment that the generating interval $\Delta T_k$ is comprised of the full sequence interval, meaning that a channel quality parameter is generated for each frequency within each sequence interval. In the illustrated case, the sequence duration L is three and hence the hopping sequence index assumes the values i=1, 2 and 3 respectively.

The significance of the generating interval $\Delta T_k$ in the illustrated case can be exemplified by assuming that the system is a GSM system where each frequency is divided into eight time slots, i.e. form a TDMA frame. The generating interval $\Delta T_k$ will then correspond to the time for one TDMA frame.

The receiver part in the transceiver unit 207 and the sequence counter 303 are connected to a multiplexor means 302. The multiplexor means 302 is able to select one of several connections, in the illustrated case three different connections, between the receiver part of the transceiver 207 and a number of mean value forming means 304a–304c.

When the sequence counter 303 indicates sequence index i=1, the connection from the receiver part of the transceiver unit 207 to the first mean value forming means 304a is selected, whereas when the sequence counter 303 changes index to sequence index i=2 the other connection is selected, and so on.

Figure 3B:
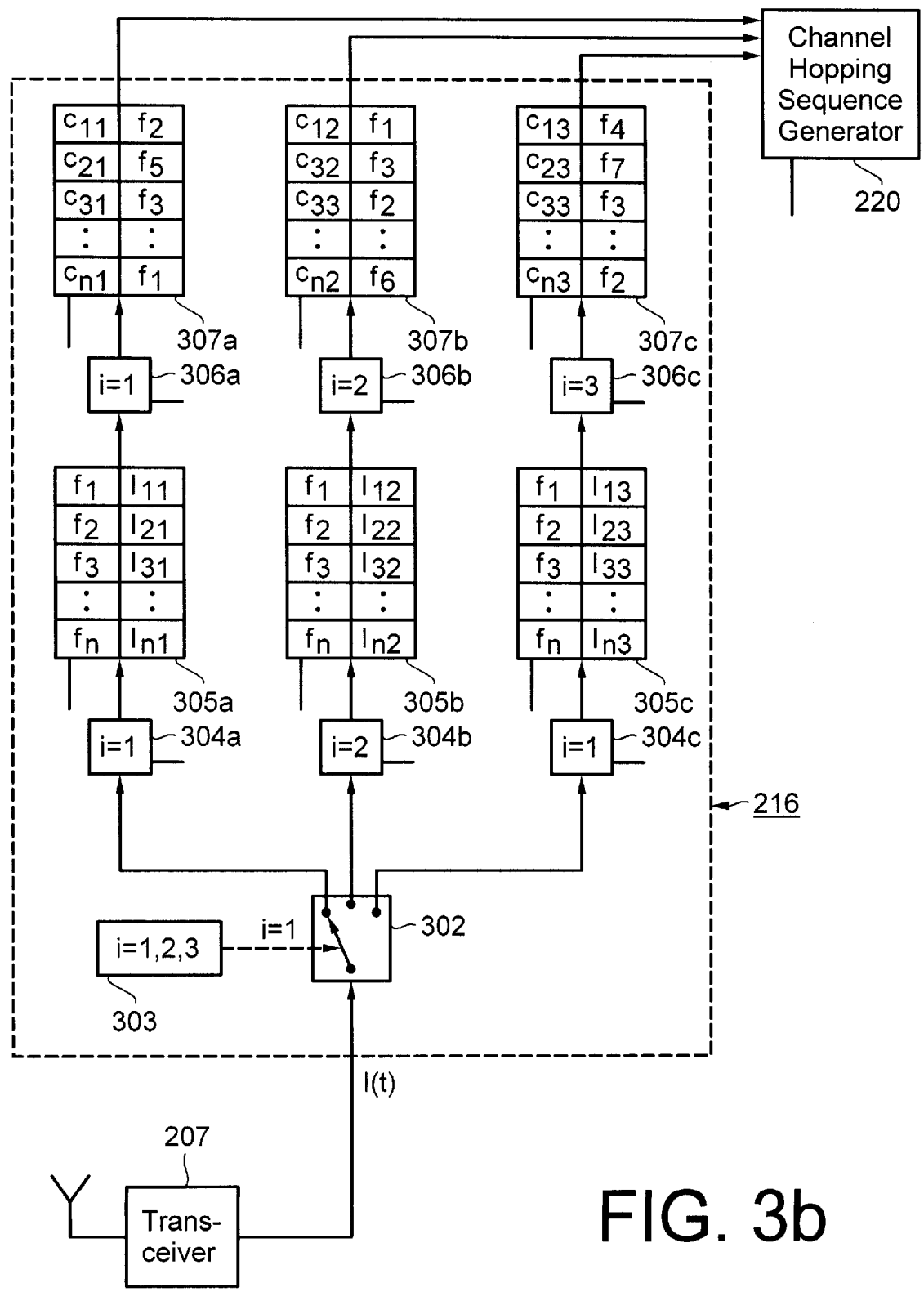
FIG. 3b illustrates in more detail a first embodiment of means for generating a channel quality parameter in accordance with the invention.

It is assumed in the following that the sequence counter 303 indicates sequence index i=1, wherein the receiver part of the transceiver unit 207 is connected to the first mean value forming means 304a via the multiplexor means 302, as shown in FIG. 3b. The means 304a includes a plurality of mean value forming filters. The means 304a is able to form a mean value for each frequency $f_x$ with respect to the values of the signal strength of the interference. When forming a mean value, the mean value forming means may utilize any type of unequivocal, monotonously increasing and non-linear imaging (for instance, a logarithmic function), so as to be able to weight different measurement values. The mean value forming process can continue during the whole of the first generating interval $\Delta T_1$ when the sequence counter 303 indicates i=1, i.e. during the time in which the means 301 is connected to the first mean value forming means 304a. The values obtained with respect to the channel quality parameter $I_{11}$–$I_{n1}$, where the first index indicates frequency number x and the second sequence index i of the respective frequency f1-fn and of sequence index i=1 are stored in a first channel quality list 305a.

The mean value forming means have been described in the present example as a means for each sequence interval. A mean value of the various sequence intervals can be formed solely by one mean value forming means that has the same function as the aforesaid three mean value forming means.

The first channel quality list 305a is then sorted by a first sorting means 306a with respect to the obtained values of the channel quality parameter. This sorting process results in a first sorted channel list 307a, wherein the frequency that is least disturbed by interference, i.e. the frequency that has the lowest channel quality parameter, is designated $c_{11}$, and the frequency that has the next lowest channel quality parameter is designated $c_{21}$, and so on, wherein the first index indicates the frequency order number and the second index indicates sequence index i.

The procedure is repeated in the same way when the sequence counter 303 indicates sequence index i=2 and i=3 respectively. A second mean value forming means 304b and a third mean value forming means 304c will then form mean values during the second and the third generating interval $\Delta T_2$ and $\Delta T_3$ respectively when the sequence counter 303 shows sequence index i=2 and i=3 respectively, therewith obtaining the respective channel quality parameter $I^{12}$–$I_{n2}$ and $I^{13}$-$I_{n3}$ for the respective frequencies f1–fn. The values are stored in a second channel quality list 305b and a third channel quality list 305c respectively, whereafter these lists are sorted by a respective second sorting means 306b and a third sorting means 306c. This results in a second sorted list 307b in which the frequency that has the best channel quality is designated c12, and a third sorted channel list 307c in which a corresponding frequency is designated $c_{13}$ with indexing in accordance with the aforegoing.

The time constant of the mean value forming filters in the mean value forming means 304a–304c is preferably in the order of magnitude of hours to days. In other words, the values are collected and mean values formed therefrom during this time period. The result obtained with the means 216 for generating a channel quality parameter is thus a sorted channel list 307a–307c for each sequence interval $T_1$–$T_3$. Respective lists contain the frequencies f1–fn sorted with respect to the value of the channel quality parameter for the respective frequency within respective sequence intervals $T_1$–$T_3$.

A frequency that has a high channel quality parameter is only slightly disturbed by interference and the frequency is therefore of good quality with respect to interference.

In order to be able to measure the interference in a generating interval within each sequence interval, it is desirable that the interference situation remains unchanged within respective sequence intervals observed by the system. This desideratum places certain requirements on the radio communications system. It is necessary that sequence counting runs coherently at both the transmitting and the receiving ends of a connection. In order to be able to measure the channel quality of frequencies within mutually different sequence intervals $T_i$, it is necessary that the various base stations within the radio communications system have mutually the same sequence duration L. The sequence interval for a base station must not be displaced in relation to the sequence interval in another base station. On the other hand, the sequence counters 303 in different base stations may be in mutually different phases within the channel hopping sequence, i.e. they need not change sequence index at the same point in time although their count frequency must be the same.

Figure 3C:
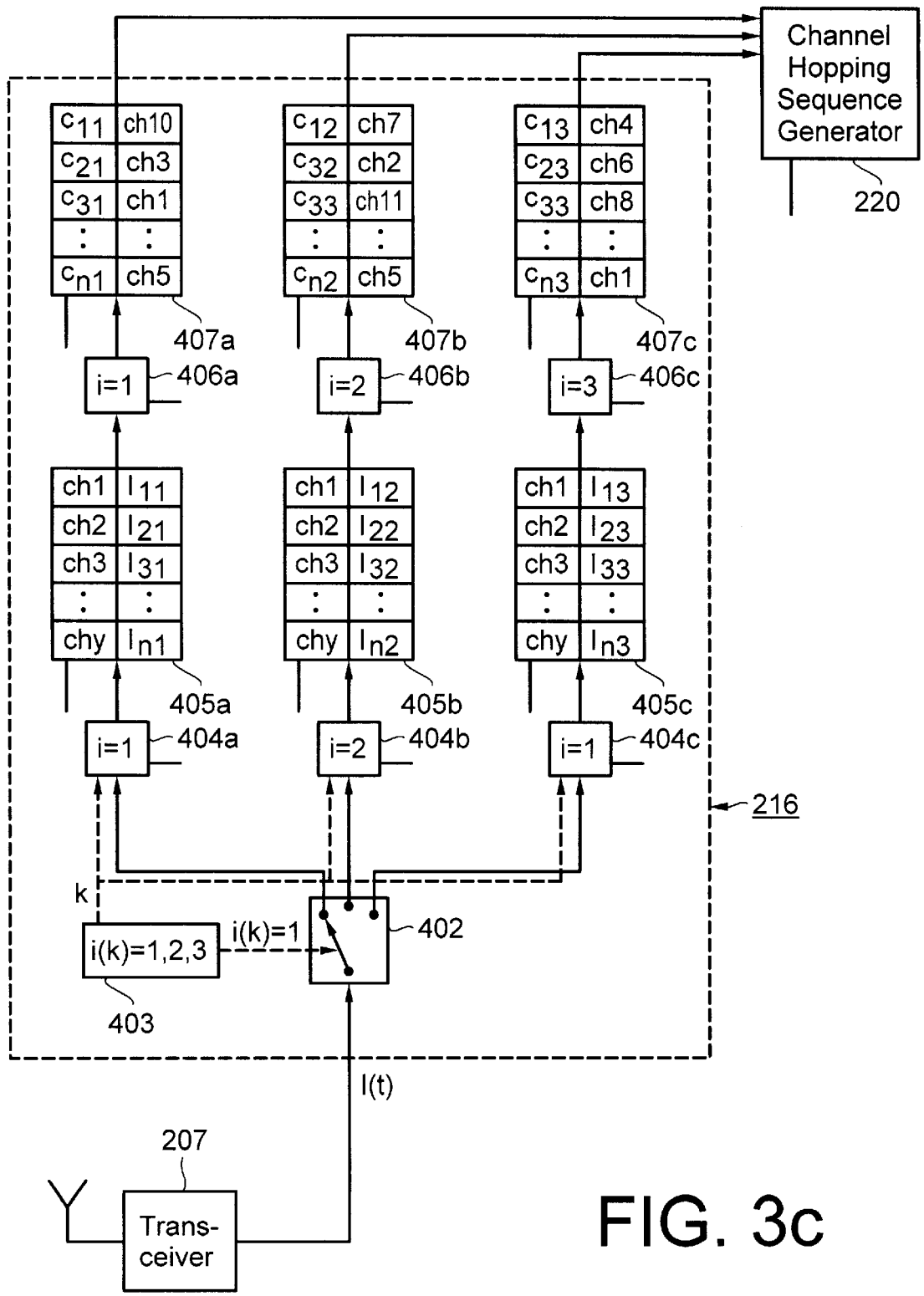
FIG. 3c illustrates in more detail a second embodiment of means for generating a channel quality parameter in accordance with the invention.

A variant of the aforedescribed embodiment of the means 216 for generating a channel quality parameter will now be described with reference to FIG. 3c. The sequence duration is the same as that in the previous embodiment, i.e. L=3, and the radio communications system is assumed to be a somewhat modified GSM system. It is assumed in this case that the generating interval $\Delta T_k$ is the time of a time slot in a TDMA frame. The index k indicates the time slot number, k=1, 2, . . , 8. The means 216 for generating a channel quality parameter includes a sequence counter 403, which, similar to the earlier case, indicates sequence index i, i.e. the sequence interval $T_i$ in which the channel hopping sequence is located, although in the present case as a function of time slots i=i(k).

A multiplexor means 402 selects connections from the receiver part of the transceiver unit 207 to three mean value forming means 404a–404c in accordance with the sequence index indicated by the sequence counter, similar to the aforedescribed. Thus, during the first sequence interval $T_1$ in which the sequence counter 403 indicates sequence index i=1 the connection from the receiver part of the transceiver unit 207 to the first mean value forming means 404a is selected and the connections to respective second and third mean value forming means 404b and 404c are not connected.

The sequence counter 403 is able to count through eight time slots, k=1, 2, . . , 8 in the time during which the first mean value forming means 404a is connected to the receiver part of the transceiver unit 207, i.e. when the sequence counter 403 indicates i=1 the sequence counter counts through 8 time slots k=1, 2, . . , 8. The sequence counter 403 controls the first mean value forming means 404a so as to form a mean value for respective generating intervals $\Delta T_k$, i.e. the time duration of a time slot k. There is obtained in this way a value of the channel quality parameter for each frequency at f1–fn and for each time slot k=1, 2, . . , 8 for respective sequence intervals $T_1$–$T_3$. In other words, there is obtained a channel quality parameter value for each channel ch1–chn and for each sequence interval $T_1$–$T_3$. The values of the channel quality parameter $I_{11}$–$I_{n1}$ obtained for the channel ch1-chn during the first sequence interval T1 when the sequence index is i=1 are stored in a first channel quality list 405a. The values of the channel quality parameter for the second and the third sequence interval $T_2$ and $T_3$ respectively when the sequence index is i=2 and i=3 respectively are obtained in a similar way. The respective values $I_{12}$–$I_{n2}$ and $I_{13}$–$I_{n3}$ are stored in a respective second and third channel quality list 405b and 405c. Each of the respective channel quality lists 405a–405c is sorted in a respective sorting means 406a–406c with respect to the measured values of the channel quality parameter. A sorted channel list 407a–407c is generated for each sequence interval $T_i$ in this way. The best channel, i.e. the channel with least disturbance, within respective sequence intervals $T_i$ is designated c1i. The next best channel in respective lists is designated $c_{2i}$, and so on.

In the present case, it is not only necessary for the radio communications system to be sequence synchronous but also time slot synchronous, i.e. the duration of the time slots may not change with time. Otherwise, the interference situation within a time slot may vary with time.

The means 220 for generating channel hopping sequences and allocating channel hopping sequences to connections will now be described in more detail. Different cases will be described in accordance with the type of radio communications system concerned. As before mentioned, channel hopping may include hopping solely between frequencies, hopping between both frequencies and time slots, and hopping solely between time slots.

The expression channel hopping sequence used below includes a hopping sequence that includes channels which are defined by frequency in an FDMA system and by frequency and time slots in a TDMA system. The expression frequency hopping sequence relates to hopping sequences that include solely frequencies. Thus, a frequency hopping sequence and a channel hopping sequence are one and the same with regard to an FDMA system.

The generation of channel hopping sequences will now be described for the case when the radio communications system is an FDMA system. The generating interval $\Delta T_k$ constitutes the entire sequence interval $T_i$, as described above with reference to FIG. 3b. This means that the sorted channel lists 307a–307c will contain frequencies. In this case, a channel is defined solely by frequency. In order to achieve orthogonality in the base stations, only one frequency from each sorted channel list may be included in a channel hopping sequence. It is necessary that respective frequencies maintain their respective sequence indexes in the channel hopping sequence. Thus, a frequency from the channel list 307a for sequence index i=1 must be used during the first sequence interval $T_1$ for sequence index i=1.

A feasible hopping sequence algorithm is to select the highest ranked frequencies from respective sorted channel lists 307a–307c, $c_{11}$, $c_{12}$, $c_{13}$ and allow these frequencies to constitute the best channel hopping sequence. The next highest ranked frequencies $c_{21}$, $c_{22}$ are then elected and allowed to constitute the next best channel hopping sequence, and so on. The three best frequencies with respect to interference will then constitute the best channel hopping sequence, while the three worst frequencies will constitute the worst channel hopping sequence.

Another inventive hopping sequence algorithm may be used to obtain a smaller quality difference between the different channel hopping sequences. According to this hopping sequence algorithm, the best frequency $c_{11}$, $c_{12}$ of respective first and second channel lists 307a and 307b and the next best frequency $c_{23}$ of the third channel list 307c are allocated to said hopping sequence algorithm. The next best frequency $c_{21}$, $c_{22}$ of respective first and second channel list 307a and 307b and the best frequency $c_{13}$ of the third channel list 307c are allocated to the next best channel hopping sequence. This procedure may be repeated pairwise for the remaining successively poorer frequencies in the channel lists 307a–307c. Thus, the third best channel hopping sequence is allocated the third best frequency $c_{31}$, $c_{32}$ from the first and the second channel lists 307a and 307b respectively and the fourth best frequency $C_{43}$ from the third channel list 307c. The difference in the quality between the various channel hopping sequences will therewith be smaller than in the former case.

It will be evident that the frequencies included in the channel lists may be allocated to channel hopping sequences in other ways, and that the choice becomes greater the longer the sequence duration L.

However, in order to maintain the orthogonality in the base station, a channel hopping sequence may never include more than one frequency from respective channel lists, i.e. from one and the same sequence interval $T_i$. The frequencies in the channel hopping sequence must also retain their sequence index i, i.e. a frequency from the first channel list 307a for sequence index i=1 must be used in the channel hopping sequence during the first sequence interval $T_i$ when sequence index is i=1.

In certain cases, the choice of frequencies to be allocated to the channel hopping sequence for a connection can be made in accordance with the earlier described principle, in which the worst connection with respect to connection quality is allocated the best channel hopping sequence with respect to interference. The next worst connection is allocated the next best channel hopping sequence, whereafter successively better connections are allocated successively poorer channel hopping sequences.

The generation of channel hopping sequences will now be described with reference to a TDMA radio communications system in which hopping between time slots is not permitted. The generating interval $\Delta T_k$ constitutes the whole of the sequence interval $T_i$, as described above with reference to FIG. 3b. Channel hopping in a system of this kind involves changing solely the frequency for respective connections, i.e. hops are made solely between channels that have mutually the same time slot. In a system of this kind, there is first generated frequency hopping sequences, for instance in accordance with the aforedescribed hopping sequence algorithms. Each connection is then allocated a respective time slot and thereafter a frequency hopping sequence. The frequency hopping sequence forms in combination with the time slot allocated to the connection a channel hopping sequence wherein each channel of said sequence is defined by the same time slot. As before mentioned, each TDMA frame contains eight time slots in the GSM system. This means that up to eight connections are able to use channel hopping sequences that contain the same frequency hopping sequence, provided that the connections are not allocated the same time slot.

One strategy is then to allow the greatest possible number of worst connections, i.e. those connections that have the highest signal attenuation parameter, to use the best frequency within respective sequence intervals. The channel hopping sequences for these connections contain different channels within respective sequence intervals, these channels all being defined by the same frequency. A channel hopping sequence for a connection is comprised of channels that are all defined by the same time slot. A number of successively better connections are allowed to use the next best frequency within each sequence interval, and so on. However, it may be appropriate to save one or more time slots that can use the same frequency hopping sequence, therewith enabling channelling hopping sequences to be used for later connections.

The generation of channel hopping sequences will now be described with reference to a TDMA radio communications system in which hopping between time slots is permitted and in which the generating interval $\Delta T_k$ constitutes the time for a sequence interval $T_i$, as described above with reference to FIG. 3b. Frequency hopping sequences are first generated with a hopping sequence algorithm as earlier described, whereafter time slot hopping sequences are generated. The time slot hopping sequences may be generated by means of a random number generator. Each frequency hopping sequence is then combined with a time slot hopping sequence from which channel hopping sequences are formed.

In the present case, frequencies can be allocated to the channel hopping sequence of a connection in accordance with the same principle as that earlier described, wherein the worst connection with respect to connection quality is allocated the best channel hopping sequence with respect to interference. The next worst connection is allocated the next best channel hopping sequence, whereafter successively better connections are allocated successively poorer channel hopping sequences.

The generation of channel hopping sequences will now be described with reference to a TDMA radio communications system when the generating interval $\Delta T_k$ constitutes the time of a time slot. As describe described above with reference to FIG. 3c, the sorted channel lists 407a–407c contain, in this case, all frequency/time slot combinations, i.e. channels which can be used for channel hopping and which are sorted with respect to the channel quality parameter. Channel hopping sequences can therefore be generated directly from said channel lists in accordance with a hopping sequence algorithm described in the first example above.

In this case, it is possible to generate channel hopping sequences when all channels in a sequence are defined by the same time slot, when hopping between time slots is not permitted.

In the present case, frequencies allocated to the channel hopping sequence or a connection may be selected in accordance with the earlier described principle, in which the worst connection with respect to connection quality is allocated the best channel hopping sequence with respect to interference. The next worst connection is allocated the next best channel hopping sequence, whereafter successively better connections are allocated successively poorer channel hopping sequences.

In all of the aforedescribed cases, the means 220 then generates a further channel hopping sequence for each connection $m_0$–$m_6$, by utilizing the duplex spacing as before mentioned. One of the channel hopping sequences is then used by the base station transmitter and the other channel hopping sequence is used by the base station receiver or respective connections. The two channel hopping sequences per connection are then stored in respective hopping sequence lists in the base station, such as the hopping sequence lists 201–203 in FIGS. 2 and 3a. The two channel hopping sequences per connection are also sent to the mobile stations over a control channel SACCH and there stored in respective hopping sequence lists, such as the hopping sequence lists 204–206 shown in FIG. 2.

For the sake of simplicity and clarity, the central processing unit, CPU, with bus line 222 and ports 212p, 213p, ..., 220p are not shown in the following Figures.

Figure 4:
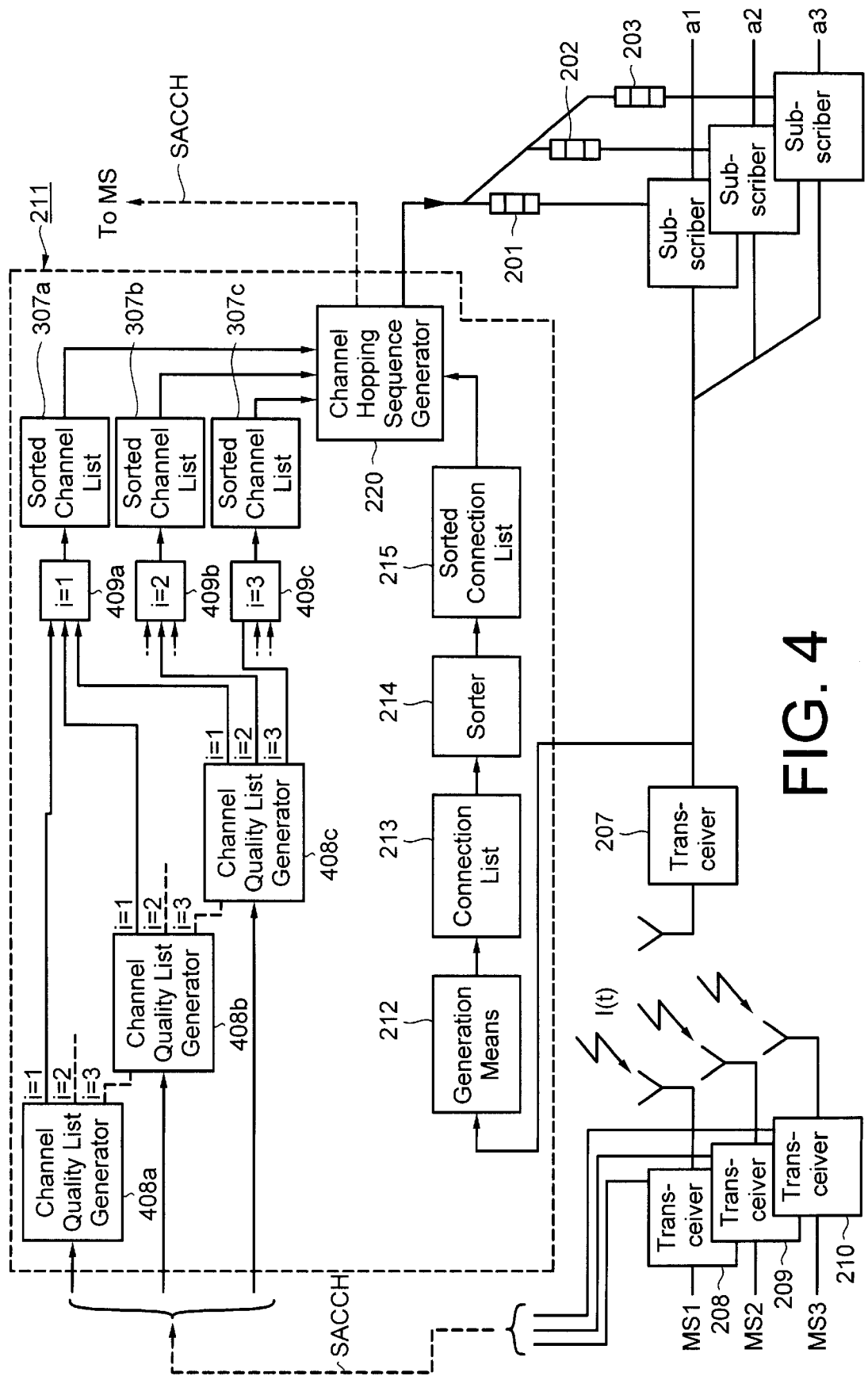
FIG. 4 is a block schematic illustrating a second embodiment of the invention.

FIG. 4 is a block schematic illustrating a second embodiment of the invention and of the channel allocating means 211. The sorted channel lists 307a–307c, 407a–407c are produced in a different way than in the embodiment illustrated in FIGS. 3a–3c. In the FIG. 4 embodiment, each mobile station MS1–MS3 measures the downlink interference I(t). Thus, each mobile station MS1–MS3 measures a mean value for the interference of the respective frequencies. These values are then sent to respective means 408a–408c for generating channel quality lists in the base station. The values are transmitted via a control channel designated SACCH, as illustrated schematically in the Figure by the broken line. The transmission of the registered interference values from the mobile stations to said means 408a–408c for generating channel quality lists in the base station are shown separately in the Figure by the broken line, for the sake of clarity, although effected with the aid of the transmitters/receivers 207–210 in a known manner.

The FIG. 4 embodiment includes three mobile stations. The base station includes a respective means 408a–408c for generating channel quality lists for each mobile station MS1–MS3. One such means 408a–408c includes the aforesaid means 302, 303, 304a–304c and 305a–305c in FIG. 3b, or the means 402, 403, 404a–404c and 405a–405c in FIG. 3c. For reasons of space, these means are shown in FIG. 4 as one single means 408a–408c. Thus, respective means 408a–408c for generating channel quality lists generate three channel quality lists, one for respective sequence intervals Ti.

Mean values are formed from the channel quality lists that have been obtained with the aid of the respective means 408a–408c for generating channel quality lists for respective sequence intervals $T_1$–$T_3$ and sorted by a first, second and third sorting means 409a–409c. Mean values are formed from the three channel quality lists that have been obtained for the first sequence interval $T_1$, when sequence index i=1, and sorted by the first sorting means 409a. Mean values are formed from the lists that have been obtained for the second sequence interval $T_2$ when sequence index i=2, and sorted by the second sorting means 409b, and so on. This is indicated in the Figure by three incoming signal paths to respective sorting means 409a–409c, one from respective means 407a–407c for generating channel quality lists. These respective sorting means 409a–409c will calculate a mean value of the values of the channel quality parameter for each frequency/channel and for each sequence interval, and sort the frequencies/channels in accordance with the calculated mean values.

When forming mean values, the means 409a–409c may use a type of unequivocal, monotonously increasing and non-linear imaging (e.g. a logarithmic function) with the intention of weighting different measurement values. A linear mean value of said values is then suitably calculated, whereafter the frequencies/channels for respective sequence intervals $T_i$ are sorted in accordance with the mean value formation, i.e. in accordance with increasing interference.

In the illustrated case, all measurement data is processed in the base station, such as mean value formation and sorting. It is also possible to allow the mobile station to carry out parts or all of the data processing up to the generation of channel hopping sequences. For instance, each mobile station may be provided with a respective means 408a–408c for generating channel quality lists, a respective sorting means 409a–409c, and respective sorted channel lists 307a–307c or 407a–407c. In this case, the sorted channel lists are sent to the base station via control channel SACCH.

Remaining means 212–215 and 220–221 operate in the same way as in the embodiment shown in FIG. 3a and will not therefore be described with reference to FIG. 4.

Figure 5:
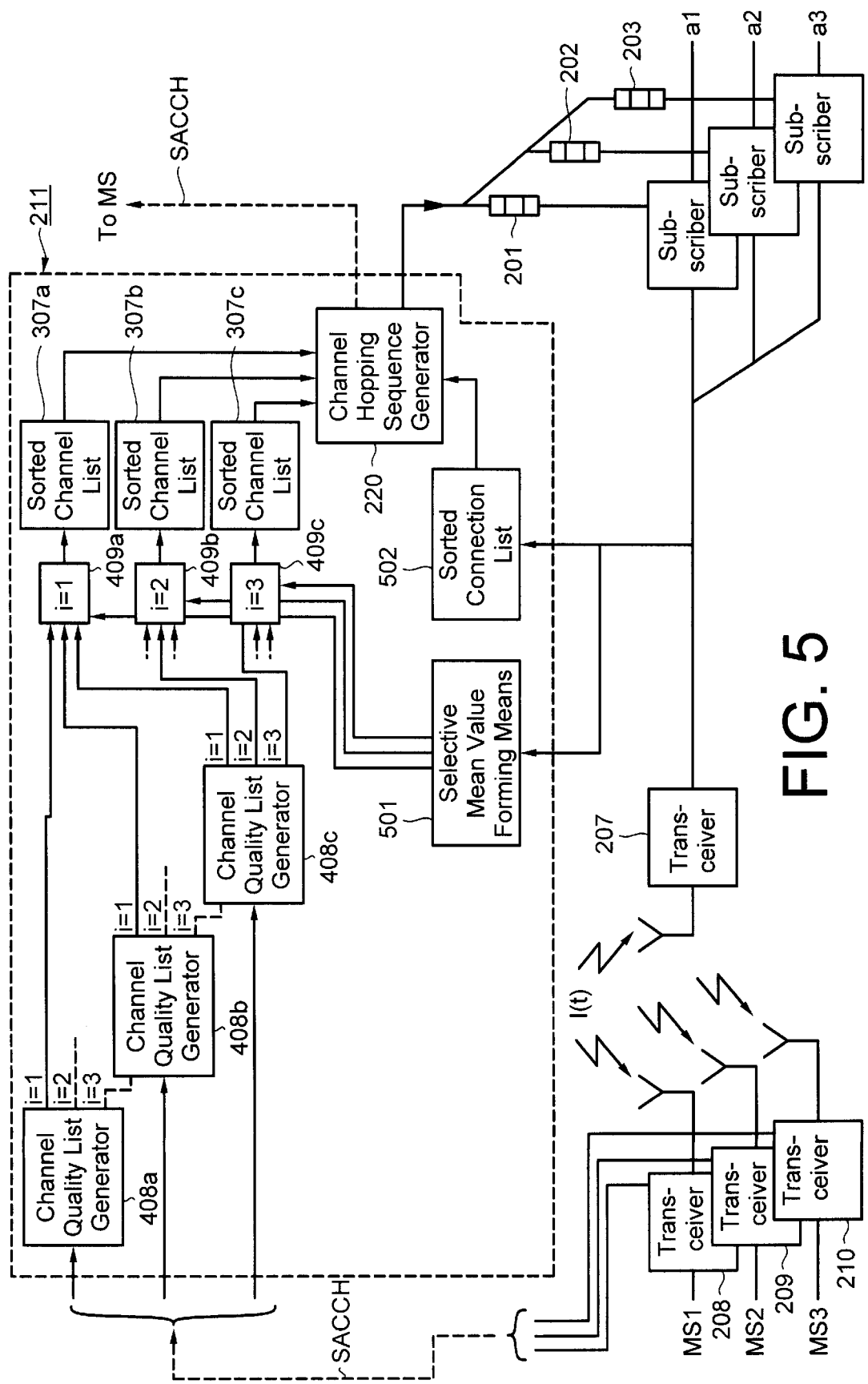
FIG. 5 is a block schematic illustrating a third embodiment of the invention.

FIG. 5 is a block schematic illustrating a third embodiment of the invention and the channel allocation means 211. Distinct from the two embodiments described with reference to FIGS. 3a–3c and FIG. 4, the sorted channel lists 307a–307c and 407a–407c respectively are produced from interference measurement values on both uplink and downlink. In this case, the downlink interference was measured by each mobile station MS1–MS3 in the same way as that described with reference to FIG. 4. The interference values measured in the uplink were also used and stored in the channel quality lists 305a–305c in FIG. 3b and 405a–405c in FIG. 3c. This was achieved with the aid of the means 302, 303, 304a–304c in FIG. 3b and 402, 403, 404a–404c in FIG. 3c for generating the channel quality parameter. For space reasons, the means 302, 303, 304a–304c and 305a–305c in FIG. 3b, or the means 402, 403, 404a–404c and 405a–405c in FIG. 3c have been drawn as one single means 501. However, in this case, the first channel quality lists 305a or 405a is connected to the first sorting means 409a for mean value formation and sorting, said first sorting means 409a operating in accordance with the principle described with reference to the FIG. 4 embodiment. The second and the third channel quality lists 305b, 405b and 305c, 405c are connected to respective second and third sorting means 409b and 409c in the same way.

This also enables the interference values measured in the uplink to be used in the calculation of the interference mean values. FIG. 5 shows the means 212–215 in FIG. 3a as a single means 502, for space saving reasons. The means 502 thus has functions corresponding to the functions of the means 212–215 shown in FIG. 3a.

Figure 6:
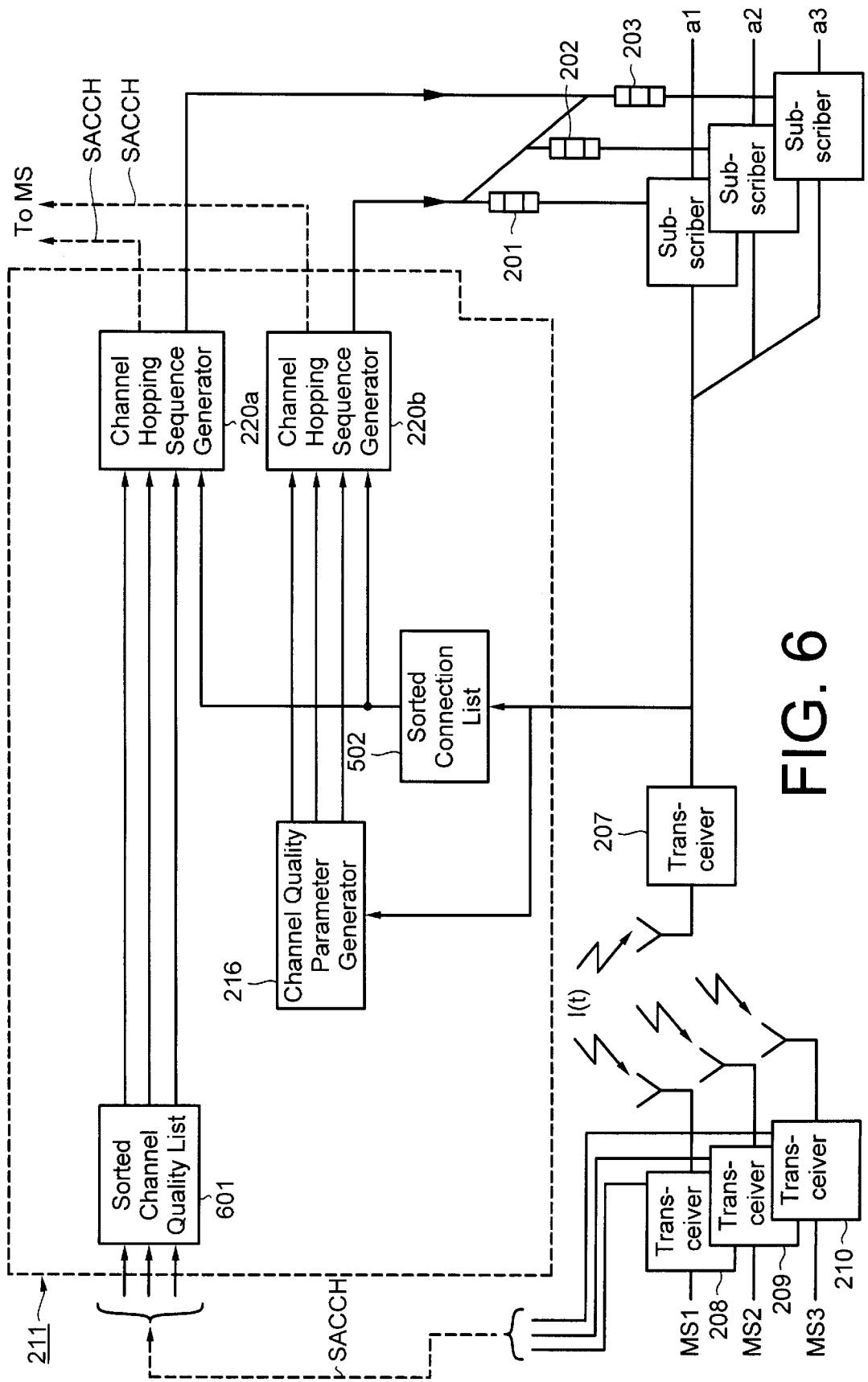
FIG. 6 is a block schematic illustrating a fourth embodiment of the invention.

FIG. 6 is a block schematic illustrating a fourth embodiment of the invention and the channel allocation means 211. Unlike the aforedescribed embodiments, the duplex spacing is not used to create channel hopping sequences in the FIG. 6 embodiment. The means 220a thus generates only one channel hopping sequence per connection, said channel hopping sequence being used for transmission from the base station, for instance. The means 220b for generating channel hopping sequences operates in accordance with the same principles as the means 220a and generates one channel hopping sequence for each connection, these channel hopping sequences being used in reception in the base station when the channel hopping sequences generated in the means 220a are used for transmission in said base station. The means 220a receives from the means 601 input data that relates to the channels. This means is corresponded by the means 408a–408c, 409a–409c and 307a–307c in FIG. 4. These input data have been obtained by measuring the interference in the downlink as described with reference to FIG. 4.

The means 220b obtains channel input data from the means 216, as earlier described with reference to FIGS. 3b and 3c. These input data have been obtained by measuring the interference in the uplink, as described with reference to FIGS. 3b and 3c.

Because the interference values measured in the uplink and downlink are not mixed, as described with reference to FIG. 5, totally independent channel hopping sequences can be created in the means 220a–220b, wherein one channel hopping sequence is used for transmission and the other channel hopping sequence is used for reception in the base station. The hopping sequences are stored in the hopping sequence lists 201–203 in the base station, and are transferred to the hopping sequence lists 204–206 in the mobile stations on the control channel SACCH in the aforedescribed manner. The means 212–215 in FIG. 3a are shown as a single means 502 in FIG. 6, for space saving reasons. The means 502 thus performs functions corresponding to those of the means 212–215 in FIG. 3a.

Figure 7:
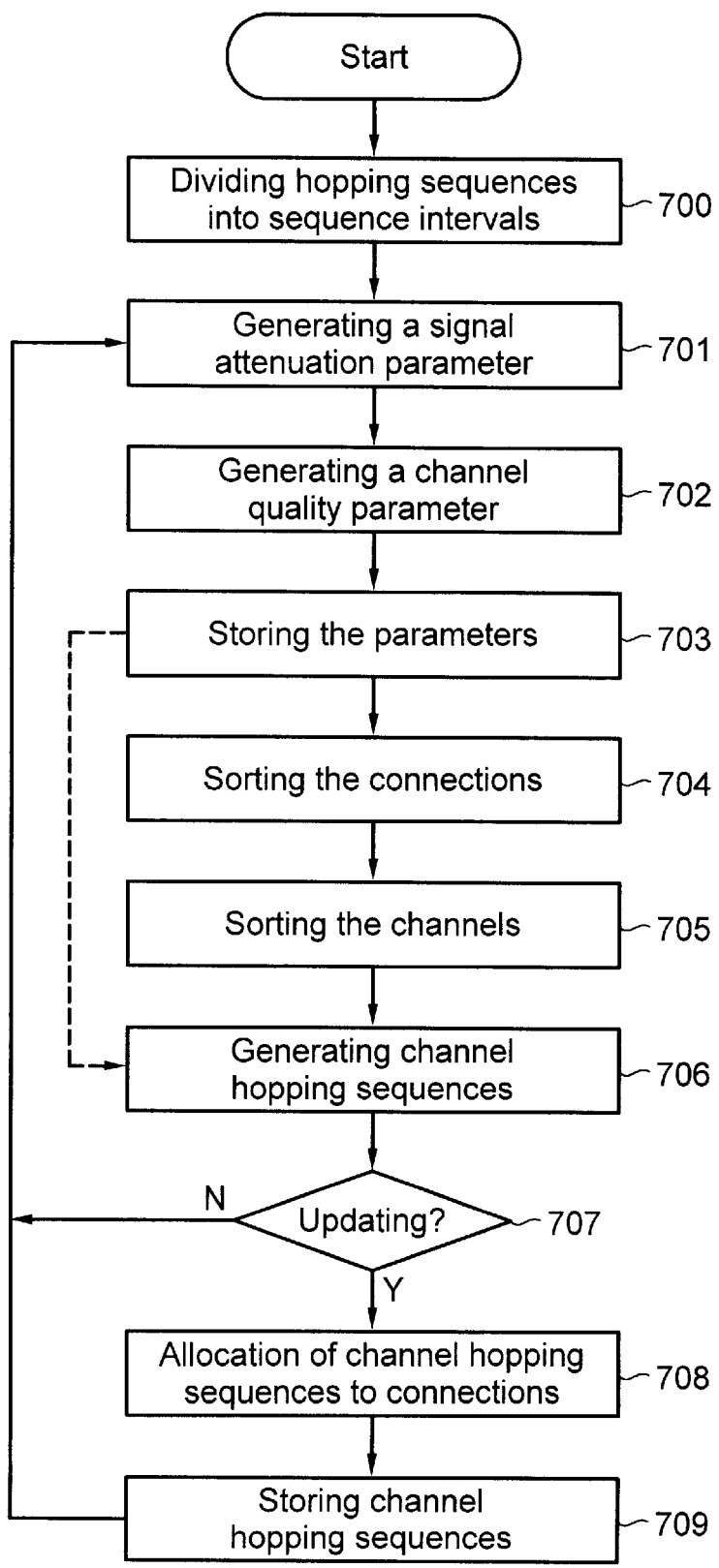
FIG. 7 is a schematic flowchart illustrating the inventive channel hopping method.

FIG. 7 is a flowchart illustrating an inventive channel hopping method.

In step 700, the channel hopping sequences are divided into sequence intervals $T_i$. The duration of a sequence interval corresponds to the time between two channel hops within a channel hopping sequence $T_i$.

In step 701, a signal attenuation parameter 8 is generated for each established connection F1–F3. The signal attenuating parameter may be generated by measuring the attenuation in the uplink and/or the downlink of each connection.

In step 702, there is then generated the channel quality parameter for each frequency f1–fn and for each generating interval $\Delta T_k$ within respective sequence intervals $T_i$. The term "each frequency" may relate, for instance, to all frequencies in a base station or to all frequencies in the entire telecommunications system, or a predetermined subset of these frequencies. The channel quality parameter can be generated by measuring the interference in the uplink and/or the downlink for each frequency f1–fn and for each generating interval $\Delta T_k$ within each sequence interval $T_i$. Other magnitudes, such as the C/I value or the bit error rate, BER, and used as input data within each sequence interval $T_i$ for calculating an interference value for each frequency f1–fn and generating interval $\Delta T_k$.

The generating interval $\Delta T_k$ may be the time of the whole of the sequence interval $T_i$ or for a part of said sequence interval. The generating interval $\Delta T_k$ may, for instance, be the time duration of a time slot in a TDMA frame in a TDMA system. In this latter case, an interference value is obtained for each channel ch1–chn and for each sequence interval $T_i$.

In step 703, the obtained values of the signal attenuation parameter are stored in a connection list 213, and the obtained values of the channel quality parameter are stored in a respective channel quality list 307a–307c or 407a–407c for respective sequence intervals $T_1$–$T_3$.

In step 704, the connections are sorted in accordance with the measured signal attenuation parameter (attenuation) and the connections are then stored in the sorted connection list 215. When using the measurement values from the uplink or from both the uplink and the downlink, a mean attenuation value is calculated for each connection and the connections then sorted in accordance with the calculated mean value.

In step 705, the frequencies/channels for respective sequence intervals $T_1$–$T_3$ are sorted in accordance with the measured channel quality parameter (interference) and then stored in the sorted channel lists 307a–307c or 407a–407c. When using the measurement values from the uplink or from both the uplink and the downlink, a mean interference value is calculated for each frequency/channel within respective sequence intervals $T_1$–$T_3$, and the frequencies/channels are then sorted within respective sequence intervals $T_1$–$T_3$ in accordance with the calculated mean value.

In step 706, there is applied a method for generating channel hopping sequences as described above with reference to the means 216 for generating channel hopping sequences. The respective channel/frequency that is to be used during a respective sequence interval in the channel hopping sequence is selected in accordance with its position in the channel list for said respective sequence interval. In accordance with what has been described with reference to FIGS. 3a–3c, there is generated a best channel hopping sequence with respect to the channel quality parameter for the channels/frequencies within respective sequence intervals. Channel hopping sequences having successively poorer channel quality than the best channel hopping sequence are then generated.

The channel hopping sequences can be used for transmitting from either the base station or the mobile station. Corresponding channel hopping sequences for receiver use may be created with the aid of the duplex spacing as described above. Another possibility is to generate channel hopping sequences for both transmission and reception for each connection with the aid of the channel hopping sequence generating method in which duplex spacing is not used. It will be understood that a channel hopping sequence that is used for transmission in the base station shall be used for reception in the mobile station, and a channel hopping sequence that is used for transmission in the mobile station shall be used for reception in the base station.

In step 707, there is carried out a check to ascertain whether or not the allocation of channel hopping sequences to the connections (F1–F3) shall be updated. If the reply is negative, in accordance with alternative N, the procedure is repeated from step 701 without updating.

If the answer is positive, according to alternative Y, each connection is allocated a channel hopping sequence in step 708 in accordance with the principle that a connection of poor connection quality with respect to the signal attenuation parameter is allocated a channel hopping sequence of good quality with respect to the channel quality parameter. The worst connection with respect to the signal attenuation parameter is allocated the best channel hopping sequence with respect to the channel quality parameter. Successively better connections are allocated successively poorer channel hopping sequences. As earlier described with reference to FIG. 3c, several channel hopping sequences may have the same channel quality. More connections can then be allocated a channel hopping sequence that includes channels having the same channel quality.

In step 709, the channel hopping sequences are stored in hopping sequence lists 201, 204–206 in the base station and the mobile stations. The base station includes a hopping sequence list for each connection and the hopping sequence lists each includes channel hopping sequences for transmission and reception respectively. The respective transmission and reception channel hopping sequences that are to be used by the mobile stations are transferred to said stations on a control channel SACCH and then stored in respective hopping sequence lists in the mobile stations. The procedure is repeated after step 708, wherein a hop to step 701 takes place.

Thus, whether or not the channel hopping sequences shall be updated is determined by a monitoring process in step 707, e.g. with the aid of the central processing unit, CPU. The channel allocation means 211 shall create "new" channel hopping sequences continuously, wherewith a new channel hopping sequence may replace an "old" channel hopping sequence when the difference in the call quality of the two channel hopping sequences exceeds a predetermined threshold value, or when the interference level exceeds a predetermined value, for instance. Updating need not be complete, i.e. the channel hopping sequences may be updated only with respect to those connections with which the difference in call quality exceeds the threshold value. It may be necessary to update when new connections are established or when the reception conditions have been changed as a result of movement of the mobile stations.

The invention can also be implemented without generating the channel hopping sequences continuously. In this case, a set of channel hopping sequences may be generated in accordance with the inventive method, for instance when starting-up the radio communications system. In a later updating of the radio communications system, a new set of channel hopping sequences can be generated and used in the next updating, and so on.

By way of an alternative, steps 704 and 705 may be jumped, wherewith the information stored in the connection and channel lists 213, 217 will constitute input data to the hopping sequence algorithm used in step 706. It will be noted that the hopping sequence algorithm does not function in accordance with the earlier described algorithms in this particular case.

Because no sorted connection lists and channel lists respectively are produced, the hopping sequence algorithm must itself find those channels that are to be used and to allocate these channels to correct connections. Thus, implementation of the hopping sequence algorithm itself can be achieved in several ways, although all hopping sequence algorithms will function in accordance with the principle: The poorer a connection with respect to a signal attenuation parameter, the better the channel with respect to a channel quality parameter allocated to the connection.

By way of an alternative, the hopping sequence lists in the base and the mobile stations may include only one channel hopping sequence. In this case, means are included for generating a further channel hopping sequence for each connection, e.g. by using the duplex spacing. Said means allocates one of the channel hopping sequences to the transmitter and the other channel hopping sequence to the receiver.

The radio communications system has been described in the preferred embodiment as including base stations within whose respective radio coverage area available channels are used in base orthogonal channel hopping sequences in radio communication with those mobile stations that are located within a given base station coverage area. The base station may be considered generally as a first radio station and the mobile stations as a number of second radio stations. The available channels within a coverage area may comprise a number of channels that are specifically allocated to the base station, a subset of the total number of channels, or all channels in the radio communications system, wherein signal attenuation parameters are generated for these channels.

It is also possible to implement parts of the described embodiment in a mobile switching centre, MSC, or in a base station switching centre, BSC, which in such case will include means for achieving the functionality of the aforedescribed means.

Generation of the channel quality parameter and/or the signal damping parameter need not necessarily imply continuous physical measurement of a magnitude. Said parameters may also be generated on the basis of theoretically generated parameter values, for instance, when starting-up the radio communications system. This can be achieved with the aid of theoretical computation models when planning the system. Channel hopping sequences are then generated in accordance with the generated values, as before described. These channel hopping sequences can then be used until an update of the radio communications system is performed, wherewith new theoretical values are generated.

It will be understood that although the Figures illustrate vehicle-carried mobile stations, the invention can also be applied in the system with portable, hand-carried mobile stations.

What is claimed is:

1. A method of channel hopping in accordance with a channel hopping sequence in a radio communications system having at least one first radio station (BS1) and at least one second radio station (MS1–MS3) with information being transmitted between said at least one first and said at least one second radio station on a plurality of connections (F1–F3), said connections being subjected to signal attenuation and interference, wherein the method comprises the steps of:

dividing the channel hopping sequences into sequence intervals ($T_i$) that together constitute the time taken to run through a channel hopping sequence;

generating a signal attenuation parameter ($\delta$) for each of the respective connections (F1–F3);

generating a channel quality parameter (I,C/I,BER) within each of the respective sequence intervals ($T_i$) for frequencies (f1–f6) that are used in the radio communications system, and for different generating intervals ($\Delta T_k$), wherein a generating interval ($\Delta T_k$) includes the duration of the whole of a sequence interval ($T_i$) or for parts of said sequence interval;

generating at least one channel hopping sequence, wherein a channel hopping sequence includes one channel for each sequence interval ($T_i$), wherein a connection hops between said channels, and wherein said at least one channel hopping sequence is generated in accordance with the generated values of the channel quality parameter (I,C/I,BER);

allocating the channel hopping sequences to a respective connection, wherein said allocation is effected in accordance with the generated values of the channel quality parameter (I,C/I,BER) for each of the sequence intervals of the channels included in the hopping sequences and in accordance with the signal attenuation parameter ($\delta$); and channel hopping between the channels included in the channel hopping sequences in radio communication on the connections between the first radio station (BS1) and said second radio stations (MS1–MS3).

2. A method according to claim 1, wherein the channel hopping sequences are stored in a respective hopping sequence list (201–203, 204–206) in the first radio station (BS1) and in said second radio stations (MS1–MS3).

3. A method according to claim 1, wherein the number of channels in a channel hopping sequence and the duration of a sequence interval ($T_i$) are constant within the radio communications system, and wherein the duration of a sequence interval ($T_i$) corresponds to the time between two channel hops.

4. A method according to 1, wherein the generating interval ($\Delta T_k$) includes the whole of the sequence interval ($T_i$).

5. A method according to 1, wherein the generating interval ($\Delta T_k$) includes the time of a time slot in a TDMA frame when the radio communications system is a TDMA system, wherein a channel quality parameter is generated for respective sequence intervals ($T_1$–$T_3$) and for respective channels (ch1–chy).

6. A method according to claim 5, wherein generation of a channel hopping sequence comprises selecting a channel in accordance with generated values of the channel quality parameter within the first sequence interval ($T_1$), said channel forming the channel in the channel hopping sequence that shall be used during the first sequence interval; and selecting further channels in accordance with the generated values of the channel quality parameter within the remaining sequence intervals ($T_2$–$T_3$), said further channels forming those channels in the channel hopping sequence that shall be used during the remaining sequence intervals.

7. A method according to claim 4, wherein generation of the channel hopping sequences further comprises selecting the best channel with respect to the channel quality parameter (I,C/I,BER) within respective sequence intervals ($T_1$–$T_3$), wherein said best channels form a best channel hopping sequence; and selecting from the remaining channels within respective sequence intervals ($T_1$–$T_3$) the best channel with respect to the channel quality parameter, wherein said channels form successively poorer channel hopping sequences with respect to the channel quality parameter in comparison with the best channel hopping sequence.

8. A method according to any claim 4, wherein generation of the channel hopping sequences further comprises selecting the best channel with respect to the channel quality parameter (I,C/I,BER) within a number of sequence intervals, and selecting the next best channel within remaining sequence intervals, said channels forming a best channel hopping sequence;

selecting the next best channel with respect to the channel quality parameter (I,C/I,BER) within those sequence intervals in which the best channels are included in the best channel hopping sequence, and selecting the best channel within remaining sequence intervals, said channels forming a next best channel hopping sequence; and selecting successively poorer channel hopping sequences in accordance with the same principle as that applied for the best and the next best channel hopping sequence, wherein the channel selection is made from the remaining channels within respective sequence intervals.

9. A method according to claim 4 where the radio communications system is a TDMA system, wherein generation of the channel hopping sequences further comprises selecting the best frequency with respect to the channel quality parameter. (I,C/I,BER) within respective sequence intervals ($T_1$–$T_3$), said best frequencies forming a best frequency hopping sequence;

selecting the best frequency with respect to the channel quality parameter from the remaining frequencies within respective sequence intervals ($T_1$–$T_3$), wherein said frequencies form successively poorer frequency hopping sequences with respect to the channel quality parameter in comparison with the best frequency hopping sequence; and selecting at least one time slot in a TDMA frame for a respective frequency hopping sequence, wherein each combination of a time slot and a frequency hopping sequence constitutes a channel hopping sequence.

10. A method according to claim 4 where the radio communications system is a TDMA system, wherein generation of the channel hopping sequences further comprises selecting the best frequency with respect to the channel quality parameter (I,C/I,BER) within a plurality of frequency intervals, and selecting the next best frequency within remaining sequence intervals, said frequencies forming a best frequency hopping sequence;

selecting the next best frequency with respect to the channel quality parameter (I,C/I,BER) within those sequence intervals where the best frequencies are included in the first frequency hopping sequence, and selecting the best frequency within remaining sequence intervals, said frequencies forming a next best frequency hopping sequence;

selecting successively poorer frequency hopping sequences in accordance with the same principle as that applied with respect to the best and the next best frequency hopping sequence, said frequencies being selected from the remaining frequencies within respective sequence intervals; and selecting at least one time slot in a TDMA frame for respective frequency hopping sequences, wherein each combination of a time slot and a frequency hopping sequence constitutes a channel hopping sequence.

11. A method according to claim 7, comprising sorting the channels (ch1–chy) for respective sequence intervals ($T_1$–$T_3$) with respect to the channel quality parameter (I,C/I,BER); and storing the sorted channels in a sorted channel list (407a–407c) for respective sequence intervals ($T_1$–$T_3$), wherein the channels for each sequence interval are stored sorted in accordance with the channel quality parameter.

12. A method according to claim 9 comprising sorting the frequencies (f1–fn) for respective sequence intervals ($T_1$–$T_3$) with respect to the channel quality parameter (I,C/I,BER); and storing the sorted frequencies in sorted channel lists (307a–307c) for respective sequence intervals ($T_1$–$T_3$), wherein the frequencies for each sequence interval are stored sorted in accordance with the channel quality parameter.

13. A method according to claim 11, wherein the selection of channels for the respective channel hopping sequences is effected in accordance with the ranking of the channels in respective sorted channel lists (307a–307c, 407a–407c).

14. A method according to claim 12, wherein selection of frequencies for the respective channel hopping sequences is effected in accordance with the ranking of the frequencies in respective sorted channel list (307a–307c).

15. A method according to claim 7, wherein allocation of channel hopping sequences to the respective connections comprises selecting the worst connection with respect to the signal attenuation parameter (δ);

allocating the best channel hopping sequence to the worst connection;

selecting successively better connections with respect to the signal attenuation parameter (δ); and allocating the successively poorer channel hopping sequences to the successively better connections.

16. A method according to claim 15, comprising sorting the connections with respect to the signal attenuation parameter (δ); and storing the sorted connections in a sorted connection list (215), wherein said connections are stored sorted in accordance with the signal attenuation parameter (δ).

17. A method according to claim 16, wherein respective connections (F1–F3) are selected in accordance with their ranking in the sorted connection list (215).

18. A method according to claim 16, wherein the generation of channel hopping sequences further comprises generating a second channel hopping sequence for each already generated channel hopping sequence by means of a duplex spacing, wherein pairs of channel hopping sequences are generated for the connections (F1–F3), and wherein the channels in one pair of channel hopping sequences are mutually separated by the duplex spacing.

19. A method according to claim 6, wherein the generation of channel hopping sequences further comprises generating two channel hopping sequences for respective connections (F1–F3), wherein the channel hopping sequences are generated in accordance with the channel quality parameters (I,C/I,BER) within the respective sequence intervals ($T_1$–$T_3$) for both channel hopping sequences.

20. A method according to claim 18, wherein the signal attenuation parameters (δ) for the connections (F1–F3) are generated by measuring signal attenuation in the uplink.

21. A method according to claim 18, wherein the signal attenuation parameters (δ) for the connections (F1–F3) are generated by measuring signal attenuation in the downlink.

22. A method according to claim 21, wherein generation of the channel quality parameters (I,C/I,BER) comprises measuring one of the values interference value, C/I value and bit error rate value (BER) in the uplink.

23. A method according to claim 18, wherein generation of the channel quality parameters (I,C/I,BER) comprises measuring one of the values interference value, C/I value and bit error rate value (BER) in the downlink, and forming mean values for the generated values of the channel quality parameter for respective sequence intervals ($T_1$–$T_3$) with respect to mutually the same frequencies and mutually the same generating intervals ($\Delta T_k$).

24. A method according to claim 18, wherein generation of the channel quality parameters (I,C/I,BER) comprises measuring one of the values interference value, C/I value and bit error rate value (BER) in both the uplink and downlink, and forming mean values for the generated values of the channel quality parameter for respective sequence intervals ($T_1$–$T_3$) with respect to mutually the same frequencies and mutually the same generating intervals ($\Delta T_k$).

25. A method according to claim 22, wherein generation of the channel quality parameter (I,C/I,BER) comprises measuring said values for all frequencies and channels included in the radio communications system.

26. A method according to claims 22, wherein generation of the channel quality parameter (I,C/I,BER) comprises measuring said values for a subset of all frequencies and channels included in the radio communications system.

27. A method according to claim 22, wherein generation of the channel quality parameter (I,C/I,BER) includes measuring said values for those channels and frequencies that are allocated to the base station.

28. A method according to claim 8, wherein allocation of the channel hopping sequences to the hopping sequence lists (307a–307c, 407a–407c) comprises transferring one of the channel hopping sequences in said pair to a hopping sequence list (201–203, 204–206) in the base station (BS1) and the other to the mobile stations (MS1–MS3).

29. (Amended) A method according to claim 28, comprising transferring the channel hopping sequences to the hopping sequence lists (204–206) of the mobile stations (MS1–MS3) via a control channel.

30. Apparatus in radio communications system comprising a first radio station (BS1) that communicates with at least one second radio station (MS1–MS3) via channels (f1–fn, ch1–chy), wherein channel hopping is effected in accordance with channel hopping sequences where each channel hopping sequence is divided into a number of sequence intervals ($T_i$) for connections (F1–F3) between the first radio station and each of the second radio stations, and wherein the connections are subjected to signal attenuation and interference, wherein said apparatus includes means (212) for generating a signal attenuation parameter ($\delta$) for each of the respective connections (F1–F3);

means (216) for generating a channel quality parameter (I,C/I,BER) within each of the respective sequence intervals ($T_i$) for each of said frequencies (f1–fn) and for different generating intervals ($\Delta T_k$), where a generating interval includes the time for the whole of a sequence interval ($T_i$) or for parts of said sequence interval; and means (220) for generating at least one channel hopping sequence for each of the respective connections, wherein a channel hopping sequence includes a channel (fi-fn, ch1-chy) for each sequence interval ($T_i$), wherein respective channels within respective sequence intervals are chosen in accordance with the generated values of the channel quality parameter (I,C/I,BER), wherein said means for generating at least one channel hopping sequence (220) allocates a channel hopping sequence to each connection (F1–F3) in accordance with the generated signal attenuation parameter ($\delta$) for respective connections (F1–F3) and in accordance with the generated values of the channel quality parameter (I,C/I,BER) for each of the sequence intervals of the channels included in the channel hopping sequences.

31. Apparatus according to claim 30, comprising at least one receiver (207) in the first radio station (BS1) and at least one receiver (208–210) in each second radio station (MS1–MS3) for receiving said signal values, wherein said signal values are delivered to said means (216) for generating said channel quality parameter, and to said means (212) for generating said signal attenuation parameter; and means (CPU) for controlling channel hopping in the radio communications system.

32. Apparatus according to claim 31, comprising means (214) for sorting the connections with respect to said signal attenuation parameter ($\delta$); and means (215) for storing the sorted connections, wherein said connections are stored sorted in accordance with said signal attenuation parameter ($\delta$).

33. Apparatus according to claim 31, wherein the means (216) for generating a channel quality parameter includes a sequence counter (303, 403) that indicates the sequence interval ($T_i$) in which the channel hopping sequence is located;

at least one mean value forming means (304a–304c, 404a–404c) which during each generating interval ($\Delta T_k$) form mean values from measurement values of the channel quality parameter (I,C/I,BER) for each frequency (f1–fn) and store said values in a channel quality list (305a–305c, 405a–405c) for respective sequence intervals ($T_i$);

a multiplexor means (302, 402) which connects the receiver (207) to one of a number of mean value forming means (304a–304c, 404a–404c) in accordance with the sequence interval ($T_i$) indicated by the sequence counter (302, 403);

sorting means (306a–306c, 406a–406c) operable to sort frequencies (f1–fn) and channels (ch1-chy) for respective sequence intervals ($T_i$) in the radio communications system with respect to the channel quality parameter (I,C/I,BER); and means (307a–307c, 407a–407c) for storing the sorted frequencies (f1–fn) and channels (ch1-chy) in accordance with the channel quality parameter (I,C/I,BER) of respective sequence intervals ($T_i$).

34. A method of generating channel hopping sequences in a radio communications system with information being transmitted between a first radio station and at least one second radio station on a plurality of connections (F1–Fn), comprising:

dividing a channel hopping sequence into sequence intervals ($T_i$) that together constitute the time taken to run through the channel hopping sequence;

generating a signal attenuation parameter ($\delta$) for each of the respective connections (F1–Fn);

generating a channel quality parameter (I,C/I,BER) within each of the respective sequence intervals ($T_i$) for frequencies (f1–fn) that are used in the radio communications system, and for different generating intervals ($\Delta T_k$), wherein a generating interval ($\Delta T_k$) includes the duration of the whole of a sequence interval ($T_i$) or for parts of said sequence interval;

generating at least one channel hopping sequence, wherein the at least one channel hopping sequence includes one channel for each sequence interval ($T_i$), wherein a connection hops between said channels, and wherein said at least one channel hopping sequence is generated in accordance with the generated values of the channel quality parameter (I,C/I,BER); and allocating the at least one generated channel hopping sequence to a respective connection, wherein said allocation is effected in accordance with the generated values of the channel quality parameter (I,C/1,BER) for each of the sequence intervals of the channels included in the generated channel hopping sequence and in accordance with the signal attenuation parameter ($\delta$).

* * * * *